United States Patent
Hattori et al.

(10) Patent No.: US 8,055,423 B2
(45) Date of Patent: Nov. 8, 2011

(54) MOTOR VEHICLE DRIVE CONTROL SYSTEM AND SENSOR UNIT FOR THE SAME

(75) Inventors: Yutaka Hattori, Hiratsuka (JP); Yasuo Hatano, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 990 days.

(21) Appl. No.: 10/561,738

(22) PCT Filed: Jun. 22, 2004

(86) PCT No.: PCT/JP2004/008737
§ 371 (c)(1),
(2), (4) Date: Feb. 29, 2008

(87) PCT Pub. No.: WO2005/000652
PCT Pub. Date: Jan. 6, 2005

(65) Prior Publication Data
US 2008/0195279 A1    Aug. 14, 2008

(30) Foreign Application Priority Data

Jun. 26, 2003 (JP) ............................ 2003-182537
Mar. 2, 2004 (JP) ............................ 2004-057370

(51) Int. Cl.
*G06F 7/02* (2006.01)
*G01D 7/04* (2006.01)
*B60T 8/62* (2006.01)
*B60K 28/16* (2006.01)

(52) U.S. Cl. ....... 701/79; 701/70; 73/862.043; 303/183; 303/189; 180/197; 180/282

(58) Field of Classification Search .................. 180/197, 180/282; 303/182, 183, 189; 73/862.043; 701/70, 79

See application file for complete search history.

(56) References Cited

U.S. PATENT DOCUMENTS

| | | | | |
|---|---|---|---|---|
| 5,408,411 A | * | 4/1995 | Nakamura et al. | 701/48 |
| 5,678,144 A | * | 10/1997 | Osaki et al. | 399/167 |
| 6,270,172 B1 | * | 8/2001 | Shirai et al. | 303/152 |
| 6,512,364 B1 | * | 1/2003 | Okada | 73/1.08 |
| 6,792,343 B2 | * | 9/2004 | Yasui et al. | 701/71 |
| 6,915,708 B2 | * | 7/2005 | Isono | 73/862.041 |
| 7,481,501 B2 | * | 1/2009 | Hattori et al. | 303/182 |
| 7,991,532 B2 | * | 8/2011 | Miki et al. | 701/80 |
| 2001/0033106 A1 | * | 10/2001 | Shirai et al. | 303/177 |
| 2005/0055149 A1 | * | 3/2005 | Kato et al. | 701/80 |
| 2005/0179530 A1 | * | 8/2005 | Stewart et al. | 340/447 |

(Continued)

FOREIGN PATENT DOCUMENTS

JP         52-109981         9/1977

(Continued)

*Primary Examiner* — Joanne Silbermann
*Assistant Examiner* — Daniel Yeagley
(74) *Attorney, Agent, or Firm* — Knobbe, Martens Olson & Bear LLP

(57) ABSTRACT

Disclosed are a motor vehicle drive control system, which easily detects accelerations, generated in the up and down, front and rear, and left and right of a motor vehicle body, in high degree of accuracy, and performs the stability control of a motor vehicle, and its sensor unit. Sensor units provided in four corners of the front and rear, and left and right of the motor vehicle body detect accelerations generated in X-, Y-, and Z-axis directions, and digital values of detection result are transmitted to a monitoring device as digital information via an electromagnetic wave. The monitoring device outputs this digital information to a stability control unit. The stability control unit performs the correction control of drive of a subthrottle actuator or a brake drive actuator on the basis of the acceleration values obtained.

8 Claims, 29 Drawing Sheets

U.S. PATENT DOCUMENTS

| | | |
|---|---|---|
| 2005/0199434 A1* | 9/2005 | Okada ............................ 180/282 |
| 2006/0108170 A1* | 5/2006 | Ishikawa et al. .............. 180/282 |
| 2007/0174002 A1* | 7/2007 | Kitazaki et al. ................. 701/70 |
| 2007/0203622 A1* | 8/2007 | Senoo et al. ..................... 701/23 |
| 2008/0065305 A1* | 3/2008 | Hattori et al. ................... 701/70 |
| 2009/0012688 A1* | 1/2009 | Hattori et al. ................... 701/79 |
| 2010/0217491 A1* | 8/2010 | Naito et al. ..................... 701/49 |

FOREIGN PATENT DOCUMENTS

| | | |
|---|---|---|
| JP | 64-012908 | 1/1989 |
| JP | 05-338528 | 12/1993 |
| JP | 06-258195 | 9/1994 |
| JP | 06-332469 | 12/1994 |
| JP | 11-094018 | 4/1999 |
| JP | 11-242050 | 9/1999 |
| JP | 2000-306188 | 11/2000 |
| JP | 2001-018775 | 1/2001 |
| JP | 2001-182578 | 7/2001 |
| JP | 2001-215175 | 8/2001 |
| JP | 2002-137721 | 5/2002 |
| JP | 2002-160616 | 6/2002 |
| JP | 2003-054229 | 2/2003 |

* cited by examiner

*Fig.* 6

*Fig.* 28
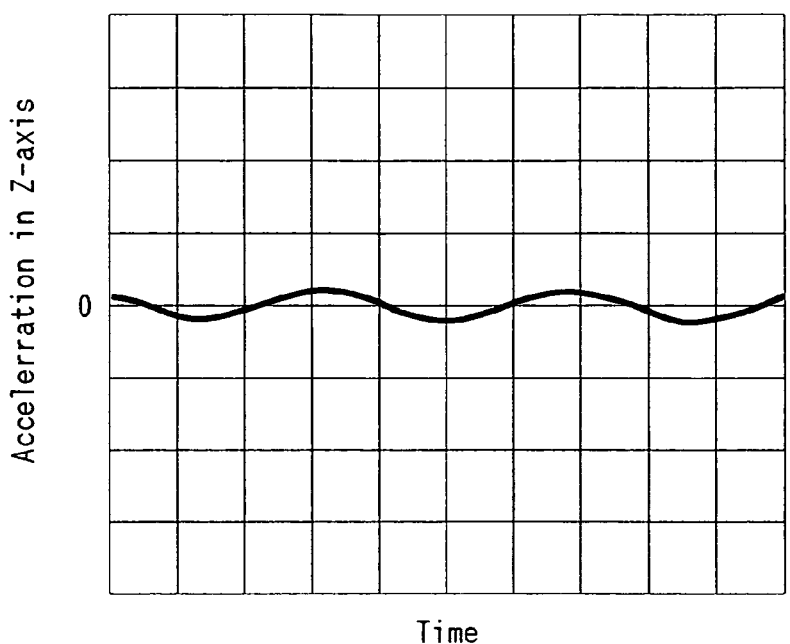
*Fig.* 29
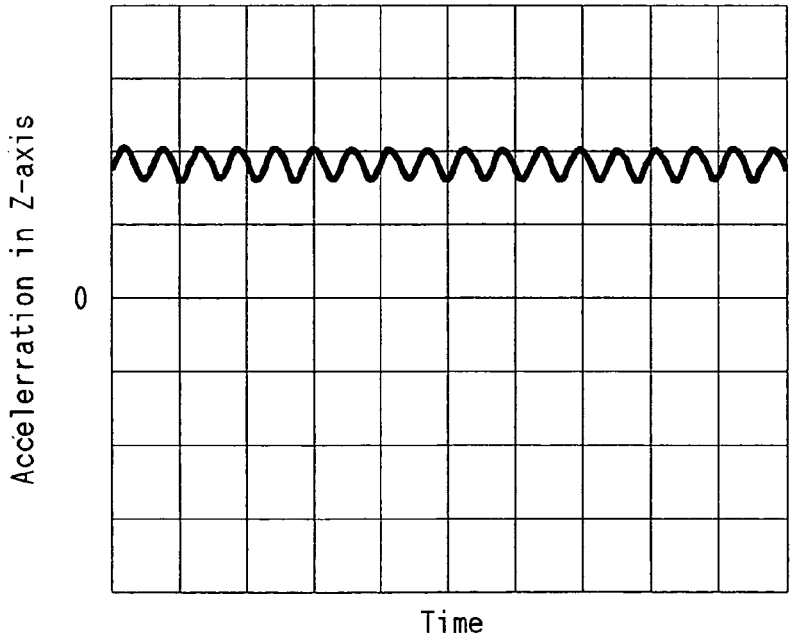

*Fig.* 34
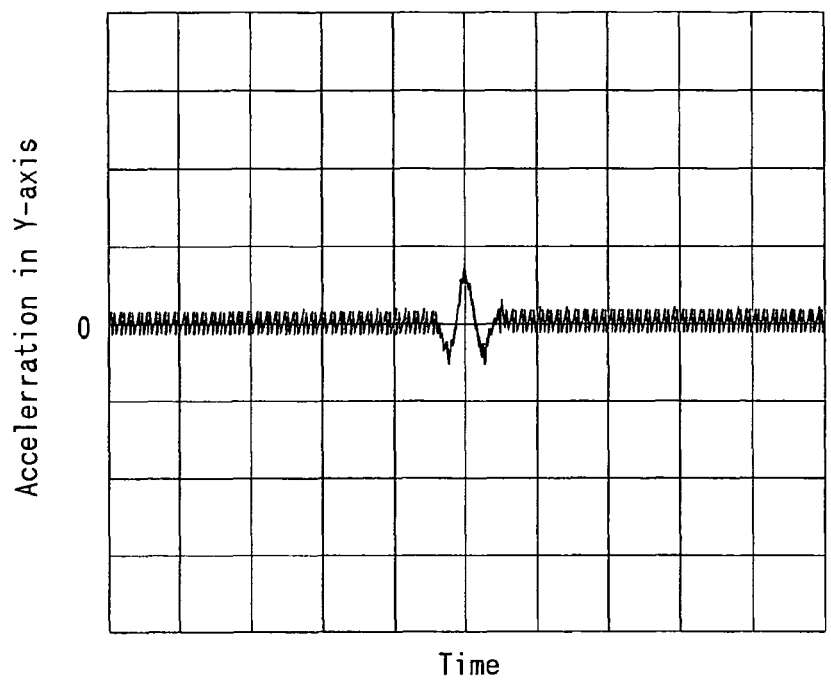
*Fig.* 35
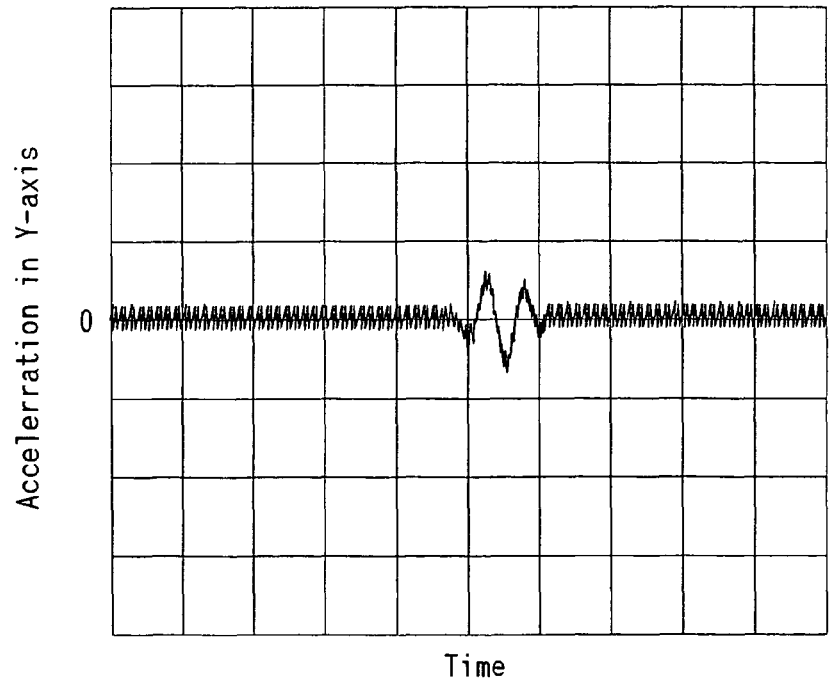

*Fig.* 36
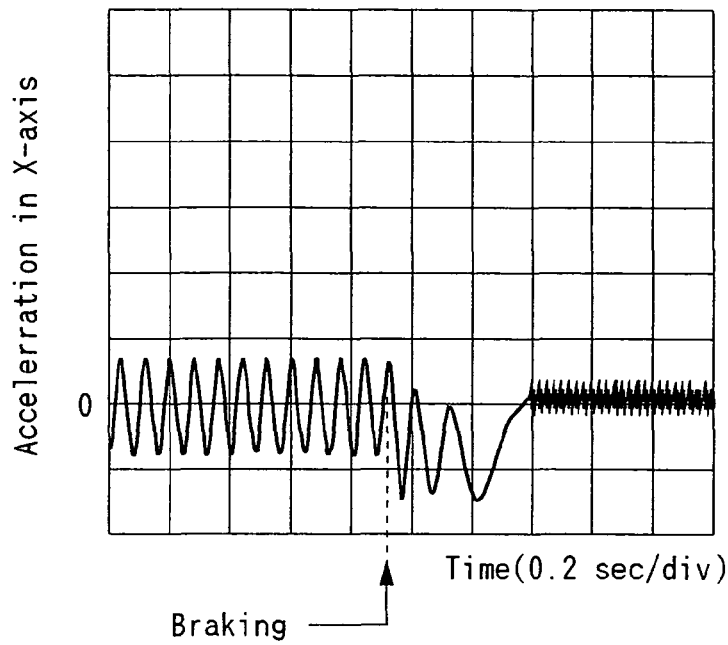
*Fig.* 37
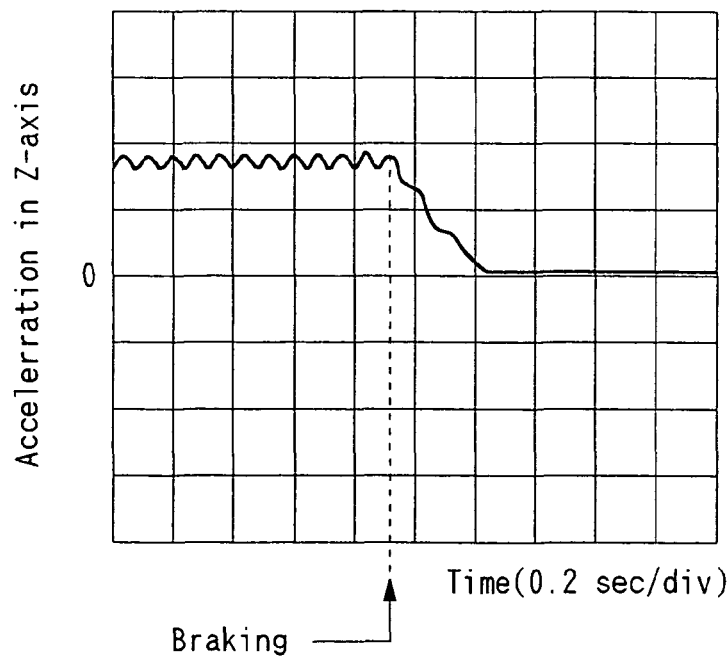

MOTOR VEHICLE DRIVE CONTROL SYSTEM AND SENSOR UNIT FOR THE SAME

TECHNICAL FIELD

The present invention relates to a motor vehicle drive control system, which performs the stability control of a motor vehicle body at the time of motor vehicle traveling, and its sensor unit.

BACKGROUND ART

Heretofore, when a road surface got wet at the time of a rainy weather season and a frictional force between the road surface and a tire degraded, slip might arise at the time of brakes being applied, a motor vehicle might move in an unexpected direction, and an accident might be caused.

In order to prevent an accident which arose by such a slip, quick start, and the like, an anti-lock brake system (hereafter, this is called an ABS), a traction control system, and further, a stability control system, which a YAW sensor was provided, and the like have been developed.

For example, the ABS is a system which detects a rotation state of each tire and controls a braking force to prevent each tire from entering into a locked state on the basis of this detection result.

It is possible to detect states such as rotating speed, air pressure, and strain of each tire as rotation states of tires and to use this detection result for control.

As examples of such a control system, for example, what are known are a motor vehicle braking apparatus disclosed in Japanese Patent Publication (Hei)05-338528 (hereafter, this is called patent document 1), a brake control apparatus disclosed in Japanese Patent Publication 2001-018775 (hereafter, this is called patent document 2), a motor vehicle control method and an apparatus thereby disclosed in Japanese Patent Publication 2001-182578 (hereafter, this is called patent document 3), a motor vehicle motion control system disclosed in Japanese Patent Publication 2002-137721 (hereafter, this is called patent document 4), a braking system disclosed in Japanese Patent Publication 2002-160616 (hereafter, this is called patent document 5), and the like.

What is disclosed in the patent document 1 is the braking system which prevents the change of brake pedal feeling on brake operation at the time of rapid brake operation and brake operation immediately after that by controlling a pump motor so that a vacuum pump operates when decelerated acceleration of a motor vehicle has reached a predetermined value is detected by an acceleration sensor 14 by negative pressure being supplied from a vacuum tank to a vacuum booster connected to a brake pedal, negative pressure being supplied from the vacuum pump to this vacuum tank, and this vacuum pump being driven by the pump motor.

What is disclosed in the patent document 2 is the brake control system in a brake control system provided with control means executing ABS control, wherein the control means comprises lateral acceleration estimating means of estimating lateral acceleration generated in a motor vehicle, and comparison test means of comparing estimated lateral acceleration by this lateral acceleration estimating means, estimated lateral acceleration by vehicle behavior detecting means, and detected lateral acceleration which a lateral acceleration sensor included in the vehicle behavior detecting means detects, judging that a normal turn corresponding to a turning angle is being performed, when difference between both is under a predetermined value, and judging that an abnormal turning is being performed, when the above-mentioned difference is not less than the predetermined value, and wherein control is switched between the cases of the judgment of the normal turn and the judgment of the abnormal turn during ABS control of the above-mentioned control means.

What is disclosed in the patent document 3 is the motor vehicle control method and apparatus thereby in a motor vehicle control method where a control signal for adjusting the deceleration and/or acceleration of a motor vehicle is formed by a corresponding setting value, and an apparatus thereby, wherein a correction coefficient denoting motor vehicle acceleration or motor vehicle deceleration generated by a traveling road surface inclination is formed, this correction coefficient is superimposed with a setting value, and the setting of the motor vehicle deceleration and/or acceleration is improved.

What is disclosed in the patent document 4 is the motor vehicle motion control apparatus which acquires side slip angle changing speed $\beta'$ of a center of gravity as an actual yawing motion state function of a motor vehicle which has a plurality of wheels, generates yawing moment, whose value becomes large as the value becomes large and whose direction decreases an absolute value of the changing speed $\beta'$, whose by making brake fluid pressure $\Delta P$ act on either of left and right rear wheel brakes when the absolute value of the changing speed $\beta'$ is not less than a setting value $\beta 0'$, continues judgment of whether slip control is necessary in a wheel on which the brake fluid pressure $\Delta P$ is made to act, also in this yawing moment control, and performs slip control of keeping a slip ratio in a proper range by suppressing brake fluid pressure $\Delta P$ when the slip control is required.

What is disclosed in the patent document 5 is the braking apparatus, which comprises at least two out of an acceleration sensor detecting acceleration in a fore-and-aft direction of a motor vehicle, a wheel speed sensor detecting the wheel speed of each wheel, and a braking pressure sensor detecting braking pressure, and which can suppress output abnormality even if a disturbance arises or one sensor breaks down, by calculating target braking pressure by feedback from the at least two sensors, calculating an indicator current in an indicator current arithmetic section on the basis of this operation result, flowing the indicator current to a brake drive actuator, and generating a braking force depending on the amount of the indicator current.

In addition, what is common as a method of detecting the rotating speed of a tire is a method of detecting the rotating speed of a tire by a rotor A1, rotating with being integrated with a wheel carrier, and a pickup sensor A2 as shown in FIGS. 38 and 39. In this method, flux density varies because a plurality of irregularities provided in a circumferential surface of the rotor A1 at equal intervals crosses a magnetic field generated by the pickup sensor A2, and a pulse-like voltage arises in a coil of the pickup sensor A2. It is possible to detect rotating speed by detecting this pulse. An example of a basic principle of this method is disclosed in Japanese Patent Publication (Sho)52-109981.

DISCLOSURE OF THE INVENTION

Nevertheless, although the improvement of the brake pedal feeling of braking control is made in the technology disclosed in the above-mentioned patent document 1, it is difficult to set a threshold value with imaging a case that a frictional force between a tire and a road surface varies, for example, a case that a slip is generated because a braking torque exceeds the frictional force between the tire and road surface, and the like.

In addition, in the technology disclosed in the above-mentioned patent documents 2 to 5, control more advanced than the technology disclosed in the above-mentioned patent document 1 is performed, the control in which the acceleration of a motor vehicle itself at the time of traveling is detected, and the braking control (brake control) of the motor vehicle is performed on the basis of this. However, since a frictional force between a tire and a road surface changes also with a type of the tire, which is mounted in a motor vehicle, or its air pressure even if it is the same motor vehicle, and further, there is a motor vehicle, which makes separately drive control of each tire, such as a four wheel drive vehicle, it may be unable to perform highly accurate control in spite of control in consideration of the acceleration of the motor vehicle itself at the time of traveling.

In view of the above-mentioned problems, the object of the present invention is to provide a motor vehicle drive control system, which easily detect acceleration, generated in the up and down, front and rear, and left and right of a motor vehicle body, in high degree of accuracy, and performs the stability control of the motor vehicle, and its sensor unit.

In order to achieve the above-mentioned object, in a motor vehicle drive control system having control means which drives each drive actuator of an engine throttle, a steering, and brakes according to the detection result of operation states of a motor vehicle to perform stability control at the time of motor vehicle traveling, the present invention proposes a motor vehicle drive control system, comprising a plurality of sensor units which are provided in the front and rear, and left and right of a motor vehicle body respectively, detect first acceleration generated in a fore-and-aft direction of the motor vehicle body, second acceleration generated in a left-and-right direction of the vehicle body, and third acceleration generated in a up-and-down direction of the motor vehicle body, convert the detection result into digital values, and transmit digital information containing the digital values, and a monitoring device which receives the digital information transmitted from the above-mentioned sensor units, and acquires the detection result of the above-mentioned first to third acceleration every sensor unit, wherein the above-mentioned control means has means of performing the correction control of drive of a predetermined drive actuator among the above-mentioned respective drive actuators on the basis of the detection result of the first to third acceleration acquired by the above-mentioned monitoring device.

According to the motor vehicle drive control system of the present invention, the above-mentioned sensor units are provided in respective predetermined positions of the front and rear, and left and right of the above-mentioned motor vehicle, the first acceleration generated in the fore-and-aft direction of the motor vehicle body, the second acceleration generated in the left-and-right direction of the motor vehicle body, and the third acceleration generated in the up-and-down direction of the motor vehicle body, in connection with motor vehicle traveling are detected by the above-mentioned sensor units, the detection result is converted into digital values, and digital information containing the digital values is transmitted.

Further, the digital information transmitted from the above-mentioned respective sensor units is received and the detection result of the above-mentioned first to third acceleration is acquired each of the above-mentioned sensor units by the above-mentioned monitoring device, the drive of the predetermined drive actuator out of the above-mentioned respective drive actuators is given correction control by the above-mentioned driving means on the basis of the detection result of the above-mentioned first acceleration, second acceleration, and third acceleration acquired by the above-mentioned monitoring device.

Here, a direction, in which the above-mentioned first acceleration is generated, and its magnitude vary by the accelerating and deceleration of a motor vehicle. In addition, a direction, in which the above-mentioned second acceleration applied to the sensor unit is generated, and magnitude vary in connection with the steering operation of the motor vehicle body. Furthermore, a direction, in which the above-mentioned third acceleration applied to the sensor unit is generates, and magnitude vary according to the vibration in an up-and-down direction of the motor vehicle body, and partial load or floating at the time of motor vehicle traveling. Hence, since it is possible to estimate the state of a motor vehicle body from the detection result of the above-mentioned first to third acceleration, it is possible to perform the correction control of drive of a predetermined drive actuator using the detection result of these first to third acceleration.

In addition, in a motor vehicle drive control system having the above-mentioned configuration, the present invention proposes a motor vehicle drive control system, wherein the above-mentioned respective sensor units are provided in the front and rear, and left and right of a motor vehicle body except wheels respectively.

According to the motor vehicle drive control system of the present invention, since the above-mentioned respective sensor units are provided in the front and rear, and left and right of a motor vehicle body except wheels respectively, it is possible to freely exchange a tire which consists of a wheel cap, a tire body, and the like.

In addition, in a motor vehicle drive control system having the above-mentioned configuration, the present invention proposes a motor vehicle drive control system, wherein the above-mentioned respective sensor units are provided in arms supporting axle shafts, respectively.

According to the motor vehicle drive control system of the present invention, the three-directional acceleration generated on the above-mentioned arms is detected by the above-mentioned sensor units.

Furthermore, in a motor vehicle drive control system having the above-mentioned configuration, the present invention proposes a motor vehicle drive control system, wherein the above-mentioned respective sensor units are provided in a plurality of bodies of rotation, which are provided in a motor vehicle body side, fix wheels, and rotate wheels, respectively.

According to the motor vehicle drive control system of the present invention, since the above-mentioned respective sensor units are provided in the bodies of rotation provided in the motor vehicle body side for mounting wheels, not on wheels, it is possible to freely exchange a tire which consists of a wheel, a tire body, and the like.

Moreover, in a motor vehicle drive control system having the above-mentioned configuration, the present invention proposes a motor vehicle drive control system, wherein the above-mentioned respective sensor units are provided on brake discs rotating with axle shafts.

According to the motor vehicle drive control system of the present invention, the three-directional acceleration generated in the above-mentioned brake discs is detected by the above-mentioned sensor units.

In addition, in a motor vehicle drive control system with the above-mentioned configuration, the present invention proposes a motor vehicle drive control system, comprising a central sensor unit which is provided in a center section of the above-mentioned motor vehicle body, detects first acceleration applied in a fore-and-aft direction of the motor vehicle body, second acceleration applied in a right-and-left direction of the motor vehicle body, and third acceleration applied in a up-and-down direction of the vehicle body, converts the detection result into a digital value, and transmits digital information containing the digital value, wherein the above-mentioned monitoring device has means of receiving digital information transmitted from the above-mentioned central sensor unit, and acquiring the detection result of the above-mentioned first to third acceleration by the above-mentioned central sensor unit, and wherein the above-mentioned control means has means of performing the correction control of drive of the above-mentioned predetermined drive actuator on the basis of the detection result of the central sensor unit acquired by the above-mentioned monitoring device and the first to third acceleration of the above-mentioned respective sensor units.

According to the motor vehicle drive control system of the present invention, the correction control of drive of the above-mentioned predetermined drive actuator is performed on the basis of the first to third acceleration detected by the central sensor unit provided in the center section of the motor vehicle body, and the first to third acceleration detected by the sensor units provided in the front and rear, and left and right of the above-mentioned motor vehicle body.

In addition, in a motor vehicle drive control system with the above-mentioned configuration, the present invention proposes a motor vehicle drive control system, wherein the above-mentioned sensor unit comprises means of wave-receiving an electromagnetic wave at a first frequency, means of transforming into electrical drive energy the above-mentioned wave-received electromagnetic wave energy at the first frequency, and means of operating by the above-mentioned electrical energy and transmitting the above-mentioned digital information using an electromagnetic wave at a second frequency, wherein the above-mentioned monitoring device comprises means of radiating the above-mentioned electromagnetic wave at the first frequency, means of wave-receiving the above-mentioned electromagnetic wave at the second frequency, and means of extracting the above-mentioned digital information from the above-mentioned wave-received electromagnetic wave at the second frequency.

According to the motor vehicle drive control system of the present invention, when the electromagnetic wave at the first frequency are radiated from the monitoring device towards the sensor unit, the sensor unit which wave-receives the electromagnetic wave at this first frequency transforms into electrical energy the energy of the electromagnetic wave at the first frequency which are wave-received. Furthermore, the sensor unit operates by the above-mentioned electrical energy, detects each acceleration, converts the detection result into a digital value, and transmits the digital information containing the digital value using the electromagnetic wave at the second frequency.

The electromagnetic wave at the second frequency transmitted from the sensor unit are wave-received by the monitoring device, and the digital value of the detection result of the above-mentioned each acceleration is extracted from the electromagnetic wave at this second frequency that are wave-received. Therefore, it is not necessary to provide a power supply in the sensor unit.

In addition, in a motor vehicle drive control system with the above-mentioned configuration, the present invention proposes a motor vehicle drive control system, wherein the above-mentioned first frequency and the above-mentioned second frequency are the same frequencies.

According to the motor vehicle drive control system of the present invention, the same frequency is used as the above-mentioned first frequency and the above-mentioned second frequency, and transmission and reception are performed in time-sharing.

Furthermore, in a motor vehicle drive control system with the above-mentioned configuration, the present invention proposes a motor vehicle drive control system, wherein the above-mentioned sensor unit comprises means of operating with the electrical energy supplied using a cable, and transmitting the above-mentioned digital information using the above-mentioned cable, and wherein the above-mentioned monitoring device comprises means of receiving the above-mentioned digital information, which is transmitted, using the above-mentioned cable.

According to the motor vehicle drive control system of the present invention, the sensor unit operates with electrical energy supplied using a cable, detects each acceleration, converts the detection result into a digital value, and transmits digital information, containing the digital value, using the above-mentioned cable.

The monitoring device receives a digital value of the detection result of the above-mentioned each acceleration using the above-mentioned cable. Therefore, it is not necessary to provide a power supply in the sensor unit.

In addition, in a motor vehicle drive control system with the above-mentioned configuration, the present invention proposes a motor vehicle drive control system, wherein the above-mentioned sensor unit has memory means where identification information unique to itself is contained, and means of transmitting the above-mentioned identification information included in the above-mentioned digital information, and wherein the above-mentioned monitoring device has means of identifying the above-mentioned sensor unit by the above-mentioned identification information.

According to the motor vehicle drive control system of the present invention, since the identification information which is unique to a sensor unit and is contained in the memory means of each sensor unit is transmitted from the sensor unit with the above-mentioned detection result, the monitoring device can judge that the digital information is transmitted from which sensor unit, by the identification information which is received from the sensor unit. Thereby, it is possible to determine by one monitoring device the digital information transmitted from each of a plurality of sensor units.

In addition, in a motor vehicle drive control system with the above-mentioned configuration, the present invention proposes a motor vehicle drive control system, wherein the above-mentioned sensor unit comprises a semiconductor acceleration sensor having a silicon piezo type diaphragm detecting acceleration in directions which are orthogonal mutually.

According to the motor vehicle drive control system of the present invention, the above-mentioned sensor unit comprises a semiconductor acceleration sensor having a silicon piezo type diaphragm, and detects the above-mentioned acceleration in directions, which are mutually orthogonal, by the semiconductor acceleration sensor.

Furthermore, in a motor vehicle drive control system having the above-mentioned configuration, the present invention proposes a motor vehicle drive control system, wherein the above-mentioned respective sensor units are provided in four corners of the front and rear, and left and right of a motor vehicle body, respectively.

According to the motor vehicle drive control system of the present invention, the three-directional acceleration generated in four corners is detected by the above-mentioned sensor units.

Moreover, in order to achieve the above-mentioned object, the present invention proposes a sensor unit, which is a sensor unit provided in each of the front and rear, and left and right of a motor vehicle body or in a center section of the motor vehicle body, and detecting acceleration generated in connection with motor vehicle traveling, and which comprises means of detecting first acceleration generated in the fore-and-aft direction of the motor vehicle body, second acceleration generated in the left-and-right direction of the motor vehicle body, and third acceleration generated in the up-and-down direction of the motor vehicle body, means of converting the detection result of the above-mentioned first to third acceleration into a digital value, and means of transmitting digital information containing the above-mentioned digital value.

According to the sensor unit of the present invention, the first acceleration generated in the fore-and-aft direction of a motor vehicle body, the second acceleration generated in the left-and-right direction of the motor vehicle body, and the third acceleration generated in the up-and-down direction of the motor vehicle body, in connection with motor vehicle traveling are detected, the detection result is converted into a digital value, and digital information containing the digital values is transmitted.

Here, a direction, in which the above-mentioned first acceleration is generated, and its magnitude vary by the accelerating and deceleration of a motor vehicle. In addition, a direction, in which acceleration in the left-and-right direction which is applied to the sensor unit is generated, and magnitude vary in connection with the steering operation of the motor vehicle body. Furthermore, a direction, in which acceleration in the up-and-down direction which is applied to the sensor unit is generates, and magnitude vary according to the vibration in the up-and-down direction of the motor vehicle body, and partial load or floating at the time of motor vehicle traveling. Hence, since it is possible to estimate the state of a motor vehicle body from the detection result of the above-mentioned first to third acceleration of each sensor unit, it is possible to perform the correction control of drive of each drive actuator, such as an engine throttle, a steering wheel, and a brake, using the detection result of these first to third acceleration.

In addition, in a sensor unit with the above-mentioned configuration, the present invention proposes a sensor unit comprising means of wave-receiving an electromagnetic wave at a first frequency, means of transforming into electrical drive energy the above-mentioned wave-received electromagnetic wave energy at the first frequency, and means of operating by the above-mentioned electrical energy and transmitting the above-mentioned digital information using an electromagnetic wave at a second frequency.

According to the sensor unit of the present invention, when the electromagnetic wave at the first frequency are radiated from the external towards the sensor unit, the sensor unit which wave-receives the electromagnetic wave at this first frequency transforms into electrical energy the energy of the electromagnetic wave at the first frequency which are wave-received. Furthermore, the sensor unit operates by the above-mentioned electrical energy, detects each acceleration, converts the detection result into a digital value, and transmits the digital information containing the digital value using the electromagnetic wave at the second frequency.

Since it is possible to wave-receive the electromagnetic wave at the second frequency transmitted from the sensor unit by an external device, and to extract a digital value of the detection result of the above-mentioned each acceleration from the electromagnetic wave at this second frequency that are wave-received.

In addition, in a sensor unit with the above-mentioned configuration, the present invention proposes a sensor unit, wherein the above-mentioned first frequency and the above-mentioned second frequency are the same frequencies.

According to the sensor unit of the present invention, the same frequency is used as the above-mentioned first frequency and the above-mentioned second frequency, and transmission and reception are performed by time-sharing.

Furthermore, in a sensor unit with the above-mentioned configuration, the present invention proposes a sensor unit, comprising means of operating with the electrical energy supplied using a cable, and transmitting the above-mentioned digital information using the above-mentioned cable.

The sensor unit of the present invention operates with electrical energy supplied from the external toward the sensor unit using a cable, detects each acceleration, converts the detection result into a digital value, and transmits digital information, containing the digital value, using the above-mentioned cable.

Since the external device can receive a digital value of the detection result of the above-mentioned each acceleration using the above-mentioned cable, it does not need to provide a power supply in the sensor unit.

In addition, in a sensor unit with the above-mentioned configuration, the present invention proposes a sensor unit, comprising memory means where identification information unique to itself is contained, and means of transmitting the above-mentioned identification information included in the above-mentioned digital information.

According to the sensor unit of the present invention, since the identification information which is unique to the sensor unit and is contained in the memory means of each sensor unit is transmitted from the sensor unit with the above-mentioned detection result, an external device can judge that the digital information is transmitted from which sensor unit, by the identification information which is received from the sensor unit. Thereby, it is possible to determine by one external device the digital information transmitted from each of a plurality of sensor units.

Furthermore, in a sensor unit with the above-mentioned configuration, the present invention proposes a sensor unit comprising a semiconductor acceleration sensor having a silicon piezo type diaphragm detecting acceleration in directions which are orthogonal mutually.

According to the sensor unit of the present invention, the above-mentioned sensor unit comprises a semiconductor acceleration sensor having a silicon piezo type diaphragm, and detects the above-mentioned acceleration in directions, which are mutually orthogonal, by the semiconductor acceleration sensor.

ADVANTAGES OF THE INVENTION

According to the motor vehicle drive control system of the present invention, because of detecting accelerations in three directions which are mutually orthogonal in high degree of accuracy by a sensor unit provided in each of the front and rear, and left and right of a motor vehicle body, and performing the correction control of drive of a predetermined actuator on the basis of the acceleration detected, it becomes possible to perform suitable control at the time of motor vehicle traveling, and to increase stability at the time of traveling. In addition, since it is possible to estimate the distortion amount of a tire, a sideslip of a motor vehicle body, the idling of a wheel, the grip of a tire, and the like from the above-mentioned acceleration, it is possible to perform further highly accurate control by using these for the braking control of a motor vehicle. Furthermore, it is possible to obtain the same effect in simpler configuration and operation by transmitting with a cable the information of the accelerations in three directions which the sensor units detect.

According to the sensor unit of the present invention, it is possible to easily detect acceleration, generated in each of the above-mentioned front and rear, and left and right, in high degree of accuracy by only providing it in each of predetermined positions of the front and rear, and left and right of a motor vehicle body. Moreover, it is possible to easily detect acceleration, generated in each of the above-mentioned bodies of rotation, in high degree of accuracy by providing a sensor unit in each body of rotation which is provided in a motor vehicle body side.

The above-mentioned objects, features, and operation and effects of the present invention will become clear by the following description and accompanying drawings.

BRIEFLY DESCRIBE OF THE DRAWINGS

FIG. 28 is a graph showing the observation result of Z-axial acceleration in the fourth embodiment of the present invention;

FIG. 29 is a graph showing the observation result of Z-axial acceleration in the fourth embodiment of the present invention;

FIG. 34 is a graph showing the observation result of Y-axial acceleration in the fourth embodiment of the present invention;

FIG. 35 is a graph showing the observation result of Y-axial acceleration in the fourth embodiment of the present invention;

FIG. 36 is a graph showing the observation result of X-axial acceleration at the time of applying the brake in the fourth embodiment of the present invention;

FIG. 37 is a graph showing the observation result of Z-axial acceleration at the time of applying the brake in the fourth embodiment of the present invention;

DESCRIPTION OF SYMBOLS

1 . . . Motor vehicle, 2 . . . Tire, 3 . . . Axle, 4 . . . Hub carrier, 5 . . . Lower arm, 6 . . . Suspension system, 61 . . . Upper mount portion, 62 . . . Spring upper seat, 63 . . . Coil spring, 64 . . . Rubber member, 65 - - - hydraulic damper, 66 . . . Damper connection member, 100, 100A, 100B, 100C . . . Sensor units, 110 . . . Antenna, 120 . . . Antenna switching unit, 130 . . . Rectifier circuit, 131, 132 . . . Diodes, 133 . . . Capacitor, 134 . . . Resistor, 140 . . . Central process section, 141 . . . CPU, 142 . . . D/A conversion circuit, 143 . . . Memory section, 150 . . . Detection section, 151 . . . Diode, 152 . . . A/D conversion circuit, 160 . . . Transmitting Section, 161 . . . Oscillation circuit, 162 . . . Modulation circuit, 163 . . . High frequency amplifying circuit, 170, 170B . . . Sensing sections, 171 . . . A/D conversion circuit, 200, 200B . . . Monitoring devices, 210 . . . Radiation unit, 211 . . . Antenna, 212 . . . Transmitting section, 220 . . . Wave receiving unit, 221 . . . Antenna, 222 . . . Detection section, 230 . . . Control section, 240 . . . Arithmetic section, 250 . . . Operating section, 301 . . . Cap tread, 302 . . . Undertread, 303A, 303B . . . Belts, 304 . . . Carcass, 305 - - - tire body, 306 . . . Rim, 410 . . . Engine, 411 . . . Accelerator pedal, 412 . . . Subthrottle actuator, 413 . . . Main throttle position sensor, 414 . . . Subthrottle position sensor, 421 . . . Steering wheel, 422 . . . Turning angle sensor, 510, 520 . . . Rotational frequency sensors, 530 . . . Brake disc, 610 . . . Brake pedal, 620 . . . Master cylinder, 630 . . . Pressure control valve, 640 . . . Brake drive actuator, 700 . . . Stability control unit, 10 . . . Semiconductor acceleration sensor, 11 . . . Pedestal, 12 . . . Silicon substrate, 13 . . . Diaphragm, 13$a$ to 13$d$ . . . Diaphragm blades, 14 . . . Thick film section, 15 . . . Plumb bob, 18A, 18B . . . Supporting members, 181 . . . Outer frame section, 182 . . . Post, 183 . . . Beam section, 184 . . . Protruding section, 184$a$ . . . Protruding section end, 31A to 31C . . . Voltage detectors, 32A to 32C . . . DC power supplies, Rx1 to Rx4, Ry1 to Ry4, Rz1 to Rz4 . . . Piezo resistance elements (diffused resistor elements).

BEST MODE FOR CARRYING OUT THE INVENTION

Hereafter, a motor vehicle drive control system of an embodiment of the present invention will be explained on the basis of drawings.

Figure 1:
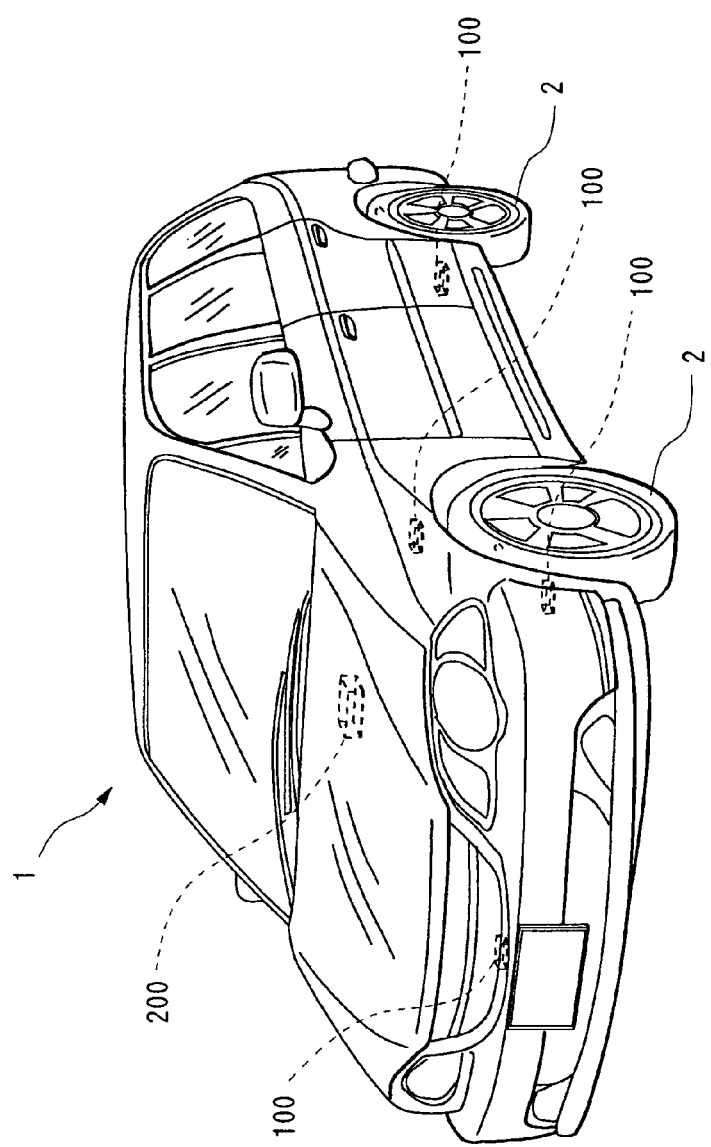
FIG. 1 is an outside view showing the arrangement of sensor units in a motor vehicle in a first embodiment of the present invention.
Figure 2:
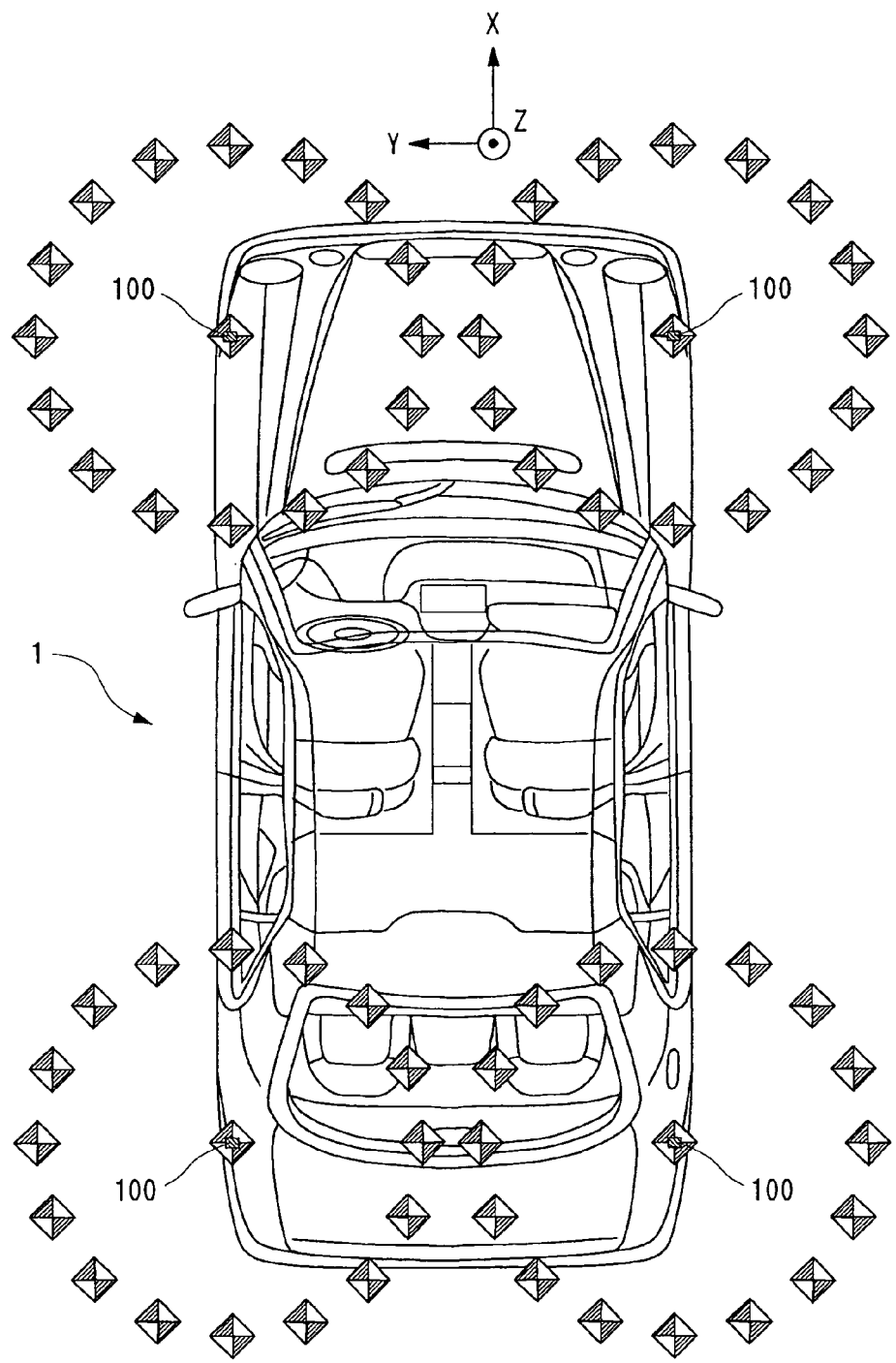
FIG. 2 is a top view showing the arrangement of sensor units in a motor vehicle in the first embodiment of the present invention.
Figure 3:
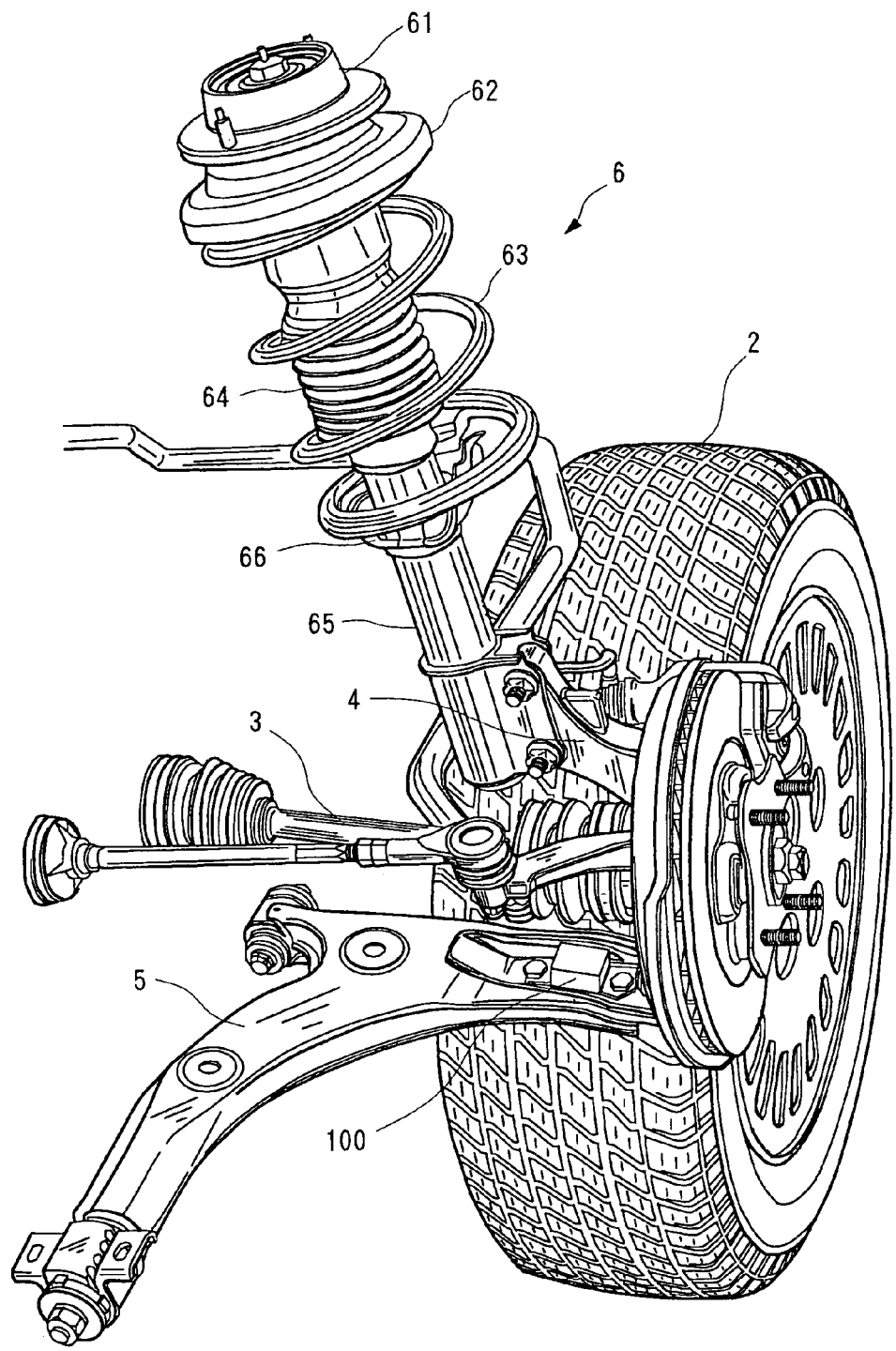
FIG. 3 is a drawing for explaining a mounted location of a sensor unit in a motor vehicle in the first embodiment of the present invention.
Figure 4:
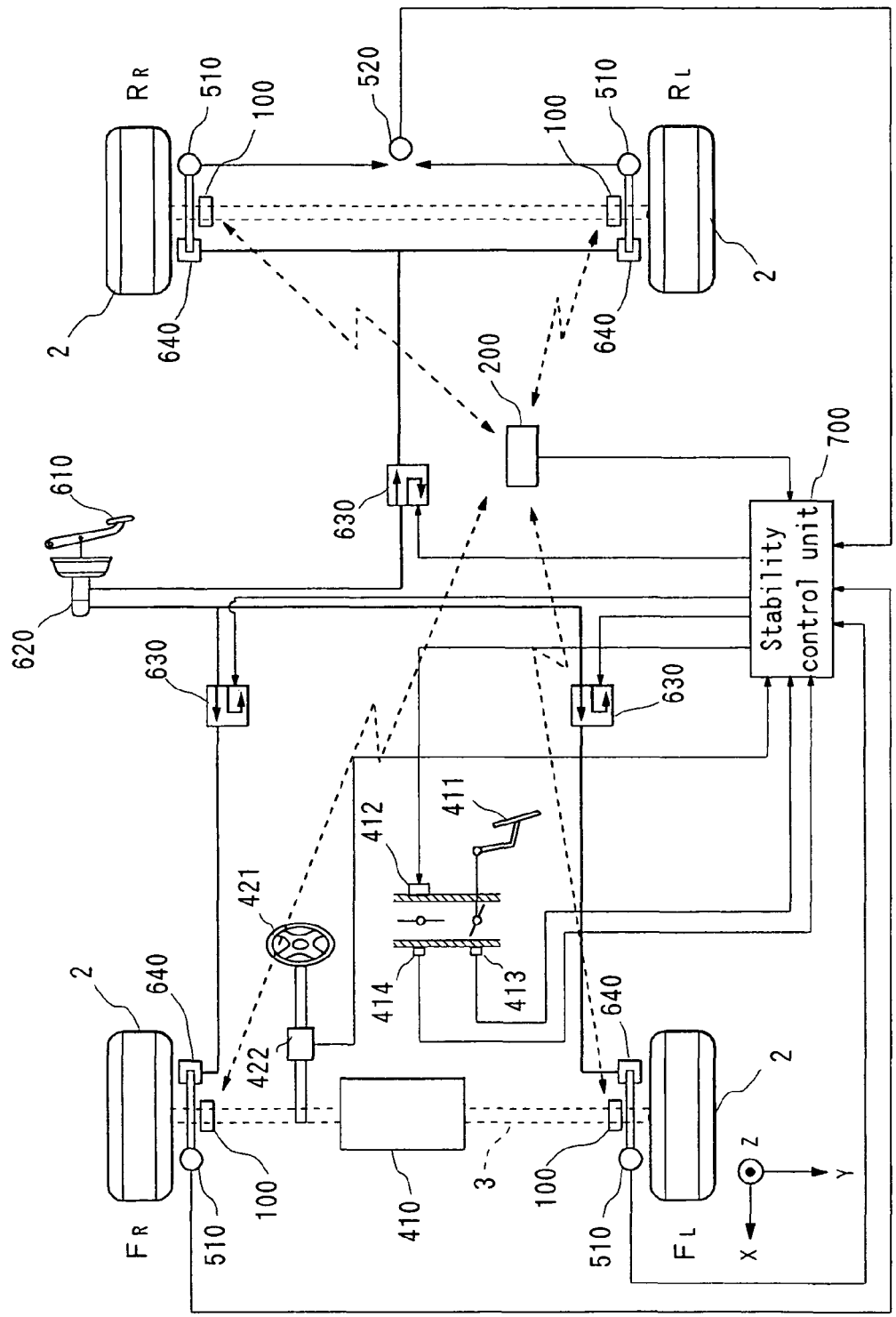
FIG. 4 is a structural diagram showing a motor vehicle drive control system in the first embodiment of the present invention.

FIG. 1 is an outside view showing the arrangement of sensor units in a motor vehicle in a first embodiment of the present invention, FIG. 2 is a top view showing the arrangement of sensor units in a motor vehicle in the first embodiment of the present invention, FIG. 3 is a drawing for explaining a mounted location of a sensor unit in a motor vehicle in the first embodiment of the present invention, and FIG. 4 is a structural diagram showing a motor vehicle drive control system in the first embodiment of the present invention. In this embodiment, a drive control system of a four-wheel vehicle will be explained as an example.

In FIGS. 1 and 2, reference numeral 1 is a motor vehicle, reference numeral 2 is a tire (wheel), reference numeral 100 is a sensor unit, and reference numeral 200 is a monitor unit. In this embodiment, each of four sensor units 100 is located near the tire 2 in the motor vehicle body side except the tire 2 of the motor vehicle 1.

In detail, as shown in FIG. 3, the sensor unit 100 is fixed in a tire side of a lower arm 5, which is a member of the motor vehicle body, so that it may move in the X-, Y-, and Z-axis directions, which are mutually orthogonal, according to the motion of the tire 2. Furthermore, in this embodiment, the X-axis is set in the fore-and-aft direction of the motor vehicle 1, the Y-axis is set in the left-and-right direction of the motor vehicle 1, and the Z-axis is set in the up-and-down direction of the motor vehicle 1.

In FIG. 3, reference numeral 2 is the tire, reference numeral 3 is an axle, reference numeral 4 is a hub carrier, reference numeral 5 is the lower arm, and reference numeral 6 is a suspension system.

The suspension system 6 comprises an upper mount section 61, a spring upper seat 62, a coil spring 63, a rubber member 64, a hydraulic damper 65, and a damper connection member 66. Furthermore, in this embodiment, a suspension system body consists of the above-mentioned spring upper seat 62, coil spring 63, rubber member 64, and hydraulic damper 65.

A top face of the upper mount section 61 for absorbing the change of an angle of the damper 65 to the motor vehicle body is connected to a motor vehicle body (not shown), and the spring upper seat 62 is mounted on a bottom face of the upper mount section 61. In addition, the coil spring 63 is mounted between the spring upper seat 62 and a circular ring saucer type guide 66 provided in the cylindrical damper 65. Furthermore, the approximately cylindrical rubber member 64 is provided inside the coil spring 63.

A lower edge of the damper 65 is fixed to the damper connection member 66, the damper connection member 66 is connected to the hub carrier 4, and the axle 3 is supported by the hub carrier 4. Furthermore, the hub carrier 4 is connected to the motor vehicle body (not shown) through the lower arm 5.

In FIG. 4, reference numeral 2 is the tire, reference numeral 3 is the axle, reference numeral 100 is a sensor unit, reference numeral 200 is a monitoring device, reference numeral 410 is an engine, reference numeral 411 is an accelerator pedal, reference numeral 412 is a subthrottle actuator, reference numeral 413 is a main throttle position sensor, reference numeral 414 is a subthrottle position sensor, reference numeral 421 is a steering wheel, reference numeral 422 is a turning angle sensor, reference numerals 510 and 520 are sensors detecting the rotating speed of a tire, reference numeral 610 is a brake pedal, reference numeral 620 is a master cylinder for a brake, reference numeral 630 is a pressure control valve which controls hydraulic pressure for a brake, reference numeral 640 is an actuator for brake drive, and reference numeral 700 is a stability control unit.

In addition, the stability control unit 700 consists of a control circuit being provided with a widely known CPU, fetches the detection result outputted from the rotational frequency sensors 510 and 520 which detect the rotating speed of each tire 2 which is mounted in the motor vehicle 1, and the detection result outputted from the throttle position sensors 413 and 414, turning angle sensor 422, and monitoring device 200, and performs stability control.

Thus, at the time of acceleration, by stepping in the accelerator pedal 411, a main throttle is opened, fuel is sent into the engine 410, and the rotating speed of the engine 410 is increased.

In addition, hydraulic pressure in a master cylinder 620 rises by stepping in a brake pedal 610 at the time of braking, this hydraulic pressure is transmitted to a brake drive actuator 640 of each tire 2 through a pressure control valve, and a braking force is applied to the rotation of each tire 2 by this.

The above-mentioned stability control unit 700 not only keeps the stability of a motor vehicle body by electrically controlling the operation status of each pressure control valve 630 as well as electrically controlling the operation status of a subthrottle actuator 412 on the basis of detection result outputted from rotational frequency sensors 510 and 520 which detect the rotating speed of each tire 2, detection result of the turning angle sensor 422, and detection result outputted from a monitoring device 200, but also automatically performs control lest the tire 2 should lock and make a slip arise.

The sensor unit 100 is fixed to a predetermined position of the lower arm 5 as mentioned above, detects X-, Y-, and Z-axial acceleration in four corners of the front and rear, and left and right of the motor vehicle 1 by an acceleration sensor which is provided in this sensor unit 100 and is described later, and converts the acceleration, which is detected, into a digital value. Furthermore, it generates and transmits digital information including the digital value of the acceleration of the detection result. Identification information unique to each sensor unit 100 besides the digital value of the above-mentioned acceleration is included in this digital information.

Furthermore, the number of the sensor units 100 provided in each lower arm 5 is not limited to one, but may be provided two or more pieces as auxiliary and the like. In addition, although the sensor unit 100 is fixed to the lower arm 5 in this embodiment, so long as it is a position which can detect the X-, Y-, and Z-axial acceleration in four corners of the motor vehicle 1, it may be fixed to a location other than the lower arm 5. In order to avoid the influence of the acceleration by the motion of the coil spring 63 in that case, it is more desirable to be fixed within a range which is lower than the coil spring 63 and can be regarded as a rigid body consecutive to the tire 2.

Figure 5:
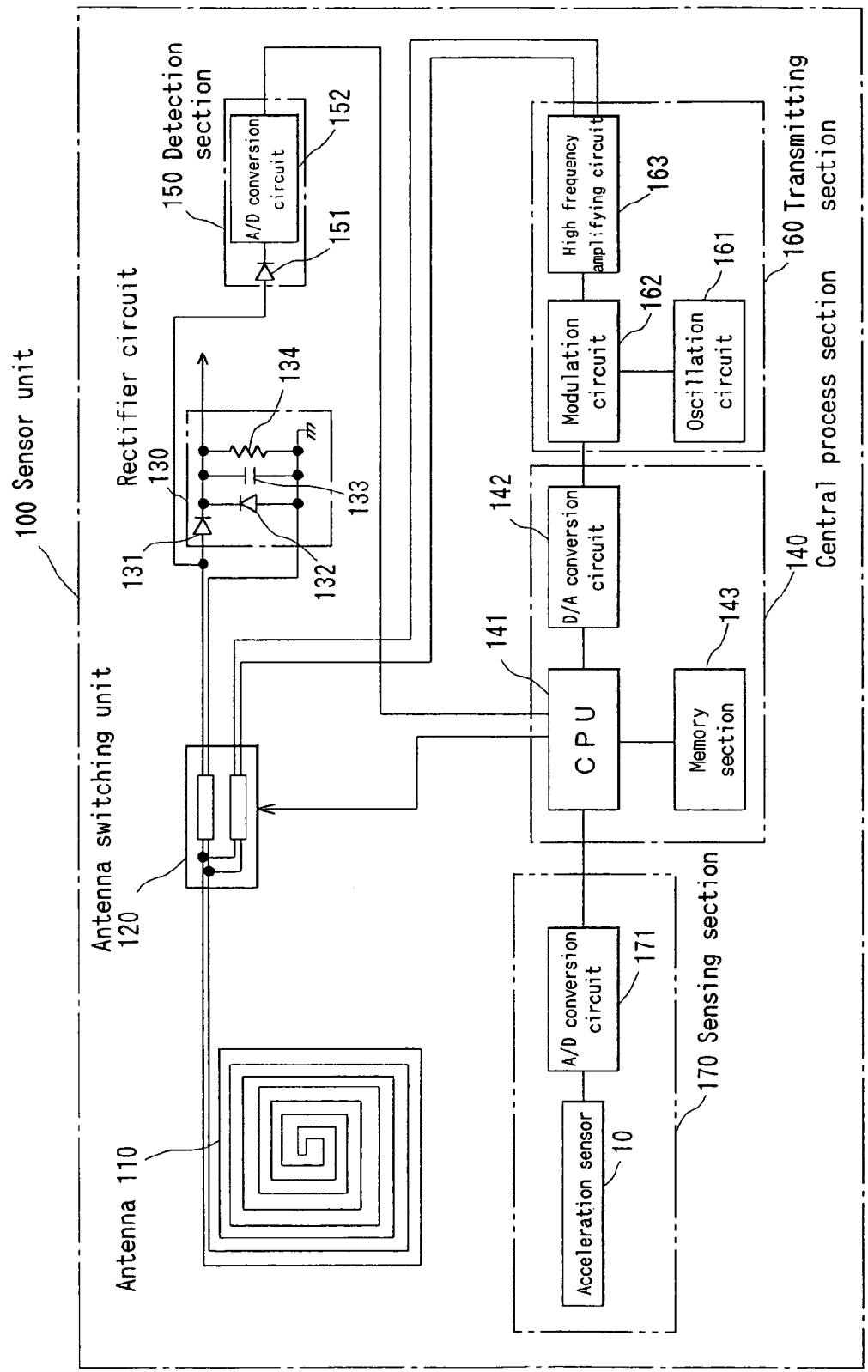
FIG. 5 is a structural diagram showing an electric system circuit of the sensor unit in the first embodiment of the present invention.

A circuit shown in FIG. 5 is cited as one embodiment of an electric system circuit of the sensor unit 100. Thus, in one embodiment shown in FIG. 5, the sensor unit 100 is composed of an antenna 110, an antenna switching unit 120, a rectifier circuit 130, a central process section 140, a detection section 150, a transmitting section 160, and a sensing section 170.

The antenna 110 is for communicating using an electromagnetic wave between with the monitoring device 200, and is matched at a predetermined frequency (first frequency) in, for example, a 2.4-GHz band.

The antenna switching unit 120 is composed of, for example, an electronic switch and the like and switches connection between the antenna 110, and rectifier circuit 130 and detection section 150, and connection between the antenna 110 and transmitting section 160 by the control of the central process section 140.

The rectifier circuit 130 is composed of diodes 131 and 132, a capacitor 133, and a resistor 134, and forms a widely known full wave rectifier circuit. The antenna 110 is connected to an input side of this rectifier circuit 130 through the antenna switching unit 120. The rectifier circuit 130 rectifies a high frequency current induced at the antenna 110, converts it into a direct current, and outputs this as a drive power supply of the central process section 140, detection section 150, transmitting section 160, and sensing section 170.

The central process section 140 is composed of a widely known CPU 141, digital/analog (hereafter, this is called D/A) conversion circuit 142, and memory section 143.

The CPU 141 operates on the basis of a program contained in semiconductor memory of the memory section 143, generates digital information including a digital value of the acceleration detection result acquired from the sensing section 170 at the time of being driven when the electrical energy is supplied, and the identification information described later, and performs the processing of transmitting this digital information to the monitoring device 200. In addition, the above-mentioned identification information unique to the sensor unit 100 is stored beforehand in the memory section 143.

The memory section 143 consists of ROM which records a program which operates the CPU 141, and, for example, nonvolatile semiconductor memory, which is electrically rewritable, such as EEPROM (electrically erasable programmable read-only memory), and the above-mentioned identification information unique to each sensor unit 100 is stored beforehand in a region, which is in the memory section 143 and is specified to be non-rewritable, at the time of production.

The detection section 150 consists of a diode 151 and an A/D converter 152, an anode of the diode 151 is connected to the antenna 110, and a cathode is connected to the CPU 141 of the central process section 140 through the A/D converter 152. Thereby, while an electromagnetic wave which is wave-received by the antenna 110 is detected by the detection section 150, a signal obtained by being detected is converted into a digital signal to be inputted into the CPU 141.

The transmitting section 160 is composed of an oscillation circuit 161, a modulation circuit 162, and a high frequency amplifying circuit 163, modulates in a modulation circuit 162 a carrier wave at a 2.45-GHz-band frequency, oscillated by the oscillation circuit 161 which is composed using a widely known PLL circuit and the like, on the basis of an information signal inputted from the central process section 140, and supplies this to the antenna 110 as a high frequency current at a 2.45-GHz-band frequency (second frequency) through the high frequency amplifying circuit 163 and antenna switching unit 120. Furthermore, although the above-mentioned first frequency and second frequency are set to be the same frequency in this embodiment, the first frequency may have a frequency different from the second frequency.

The sensing section 170 is composed of an acceleration sensor 10 and an A/D conversion circuit 171.

The acceleration sensor 10 is composed of a semiconductor acceleration sensor as shown in FIGS. 6 to 9.

Figure 6:
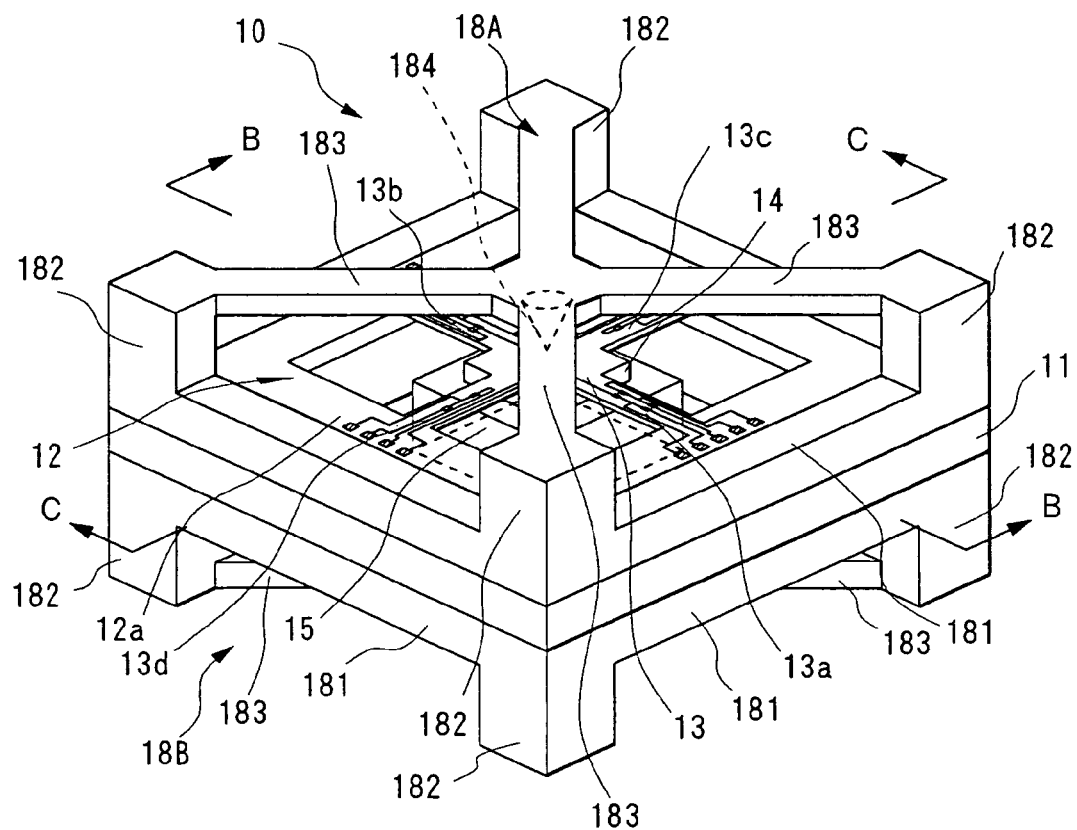
FIG. 6 is an external perspective view showing a semiconductor acceleration sensor in the first embodiment of the present invention.
Figure 7:
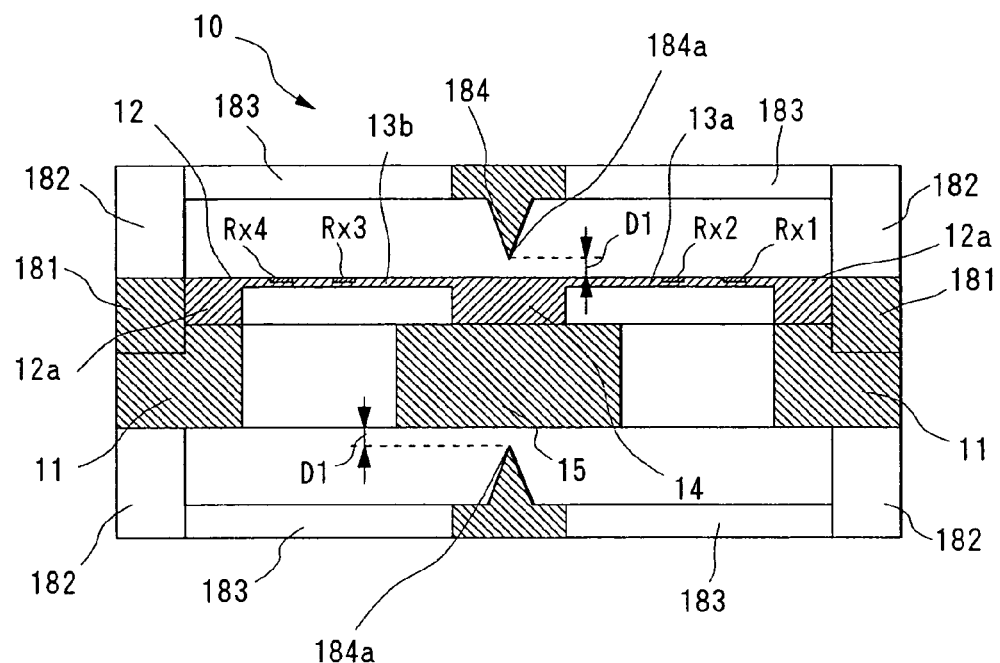
FIG. 7 is a sectional view taken in the direction of arrows along line B-B in FIG. 6.
Figure 8:
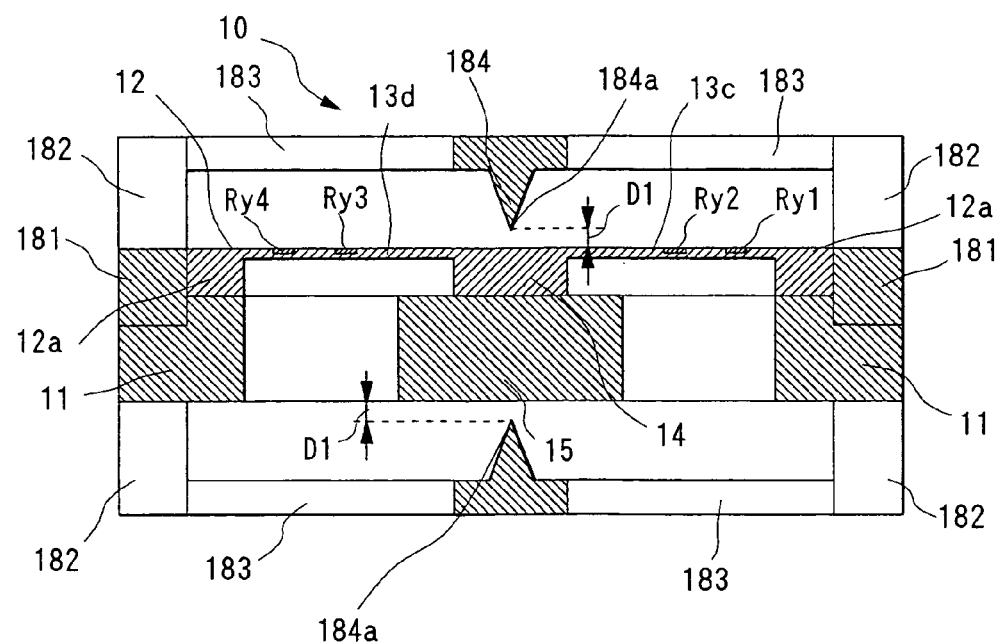
FIG. 8 is a sectional view taken in the direction of arrows along line C-C in FIG. 6.
Figure 9:
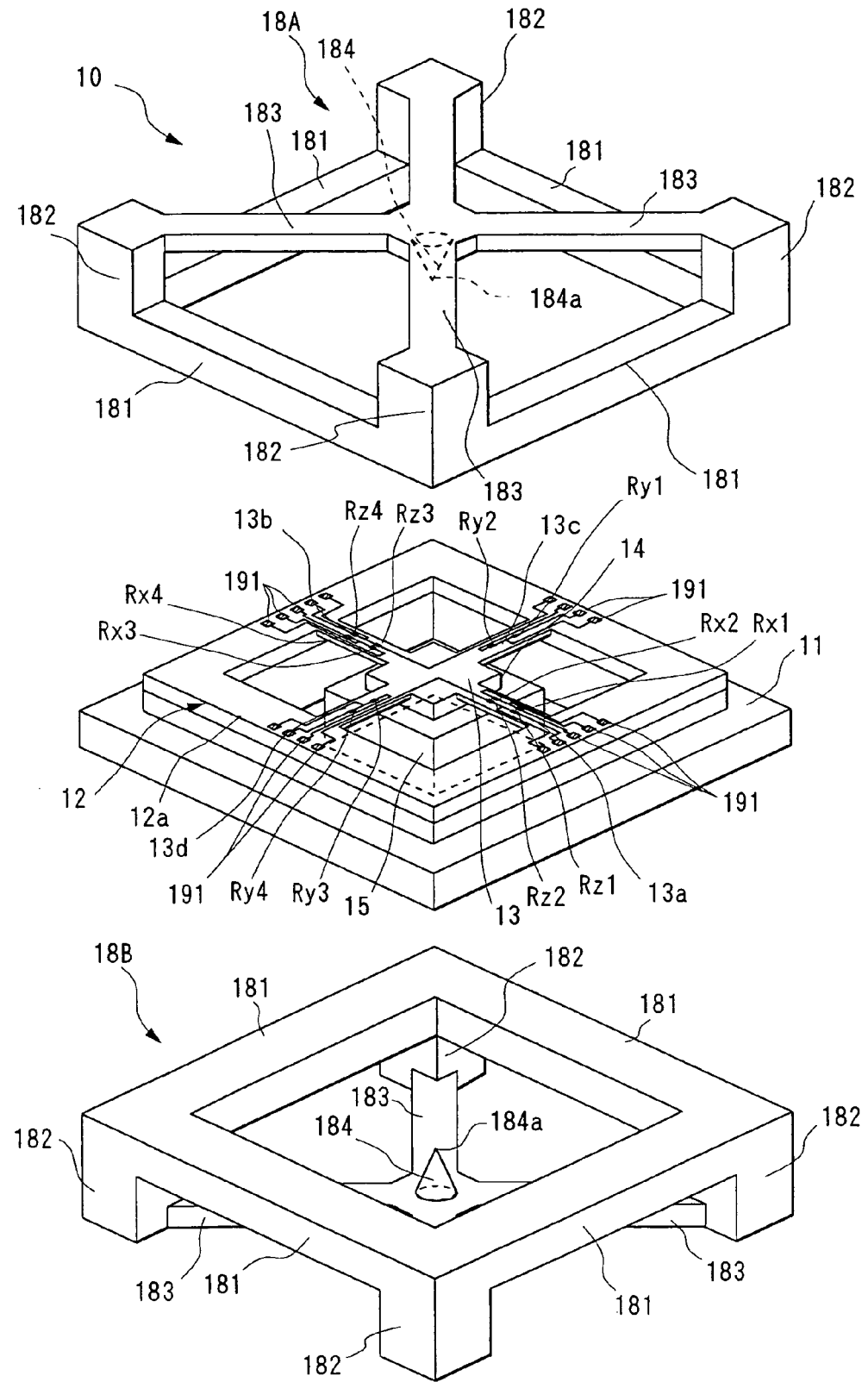
FIG. 9 is an exploded perspective view showing a semiconductor acceleration sensor in the first embodiment of the present invention.

FIG. 6 is an external perspective view showing a semiconductor acceleration sensor in the first embodiment of the present invention, FIG. 7 is a sectional view taken in the direction of arrows along line B-B in FIG. 6, FIG. 8 is a sectional view taken in the direction of arrows along line C-C in FIG. 6, and FIG. 9 is an exploded perspective view.

In the drawings, reference numeral 10 denotes a semiconductor acceleration sensor, which is composed of a pedestal 11, a silicon substrate 12, and supporting members 18A and 18B.

The pedestal 11 has a rectangular frame type form, and the silicon substrate (silicon wafer) 12 is installed on an aperture of the pedestal 11. In addition, an outer frame section 181 of the supporting members 18A and 18B is fixed to an outer circumferential portion of the pedestal 11.

The silicon substrate 12 is provided on the aperture of the pedestal 11, a cross-shaped diaphragm 13 in a thin film is formed in a center section in a wafer peripheral frame section 12a, and piezo resistance elements (diffused resistor elements) Rx1 to RX4, Ry1 to Ry4, and Rz1 to Rz4 are formed on top faces of respective diaphragm blades 13a to 13d.

Figure 10:
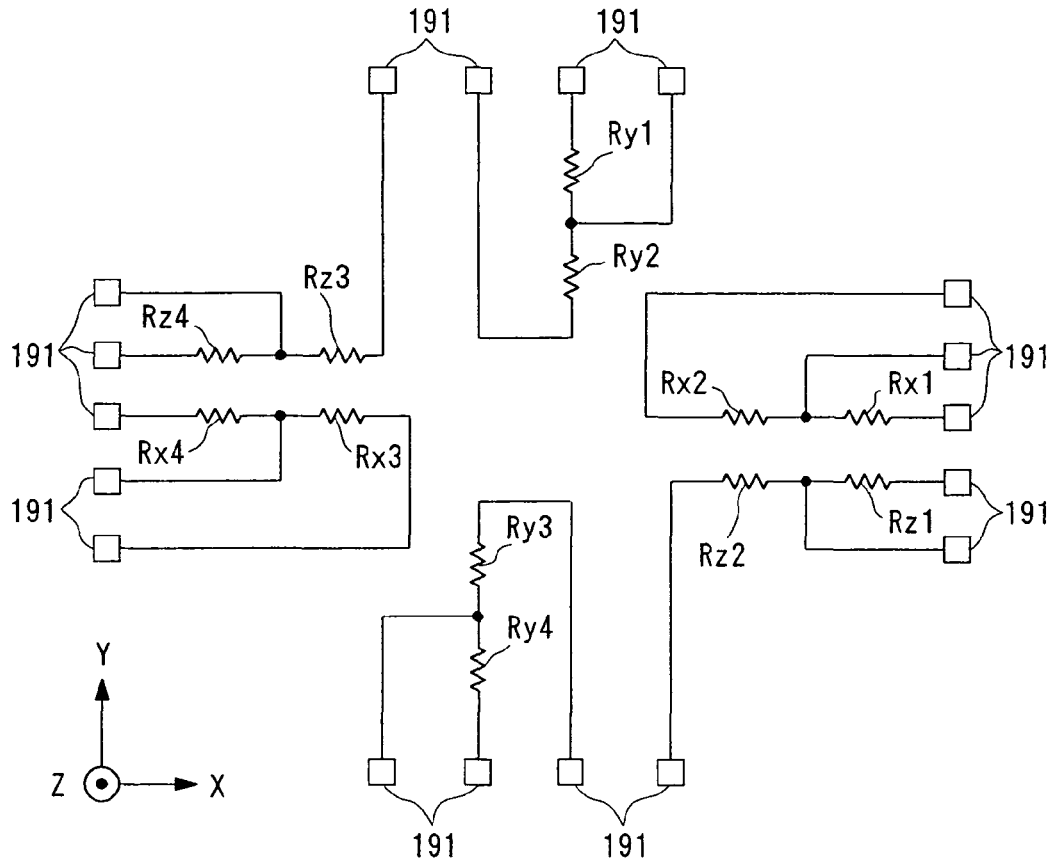
FIG. 10 is a structural diagram showing an electric system circuit of the semiconductor acceleration sensor in the first embodiment of the present invention.

In detail, the piezo resistance elements Rx1, Rx2, Rz1, and Rz2 are formed on the diaphragm blade 13a out of the diaphragm blades 13a and 13b located on a straight line, and the piezo resistance elements Rx3, Rx4, Rz3, and Rz4 are formed on the other diaphragm blade 13b. In addition, the piezo resistance elements Ry1 and Ry2 are formed on the diaphragm blade 13c out of the diaphragm blades 13c and 13d located on a straight line which is orthogonal to the diaphragm blades 13a and 13b, and piezo resistance elements Ry3 and Ry4 are formed on the other diaphragm blade 13d. Furthermore, these piezo resistance elements Rx1 to Rx4, Ry1 to Ry4, Rz1 to Rz4 are connected as shown in FIG. 10 so as to be able to constitute resistance bridge circuits for detecting the accelerations in the X-, Y-, and Z-axis directions which are mutually orthogonal, and are connected to electrodes 191 for connection which are provided on a surface of an outer circumferential portion of the silicon substrate 12.

Furthermore, a thick film section 14 is formed on an crossing section of the diaphragm blades 13a to 13d in a face side of a center section of the diaphragm 13, and a plumb bob 15 with a rectangular parallelepiped shape which consists of glass and the like is installed on a surface of this thick film section 14.

On the other hand, the above-mentioned supporting members 18A and 18B are composed of an outer frame section 181 with a rectangular frame shape, four posts 182 installed in a standing manner in four corners of a fixed portion, a cross-shaped beam section 183 provided so that an end section of each post may be connected, and a conical protruding section 184 provided in a central crossing portion of the beam section 183.

The outer frame section 181 is fit with and fixed to an outer circumferential portion of the pedestal 11 so that the protruding section 184 may be positioned in another side of the diaphragm 13, that is, in a side where the plumb bob 15 does not exist. Here, setting is performed so that an end 184a of the protruding section 184 may be positioned at a distance D1 from a surface of the diaphragm 13 or plumb bob 15. This distance D1 is set at a value which can be restricted by the protruding section 184 lest respective diaphragm blades 13a to 13d should been extended to limits, even if acceleration arises in a direction perpendicular to the face of the diaphragm 13 and a force equal to or more than a predetermined value is applied to both face sides of the diaphragm 13 by this acceleration.

Figure 11:
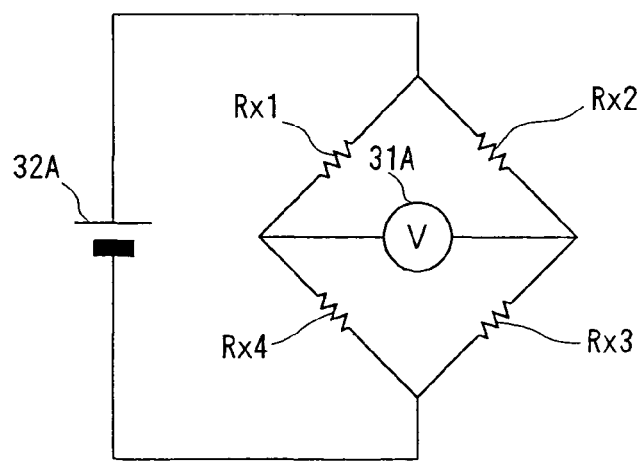
FIG. 11 is a diagram showing a bridge circuit detecting X-axial acceleration using the semiconductor acceleration sensor in the first embodiment of the present invention.
Figure 12:
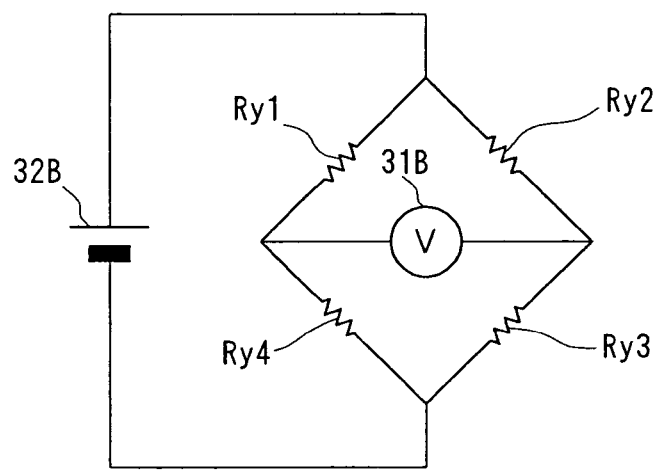
FIG. 12 is a diagram showing a bridge circuit detecting Y-axial acceleration using the semiconductor acceleration sensor in the first embodiment of the present invention.
Figure 13:
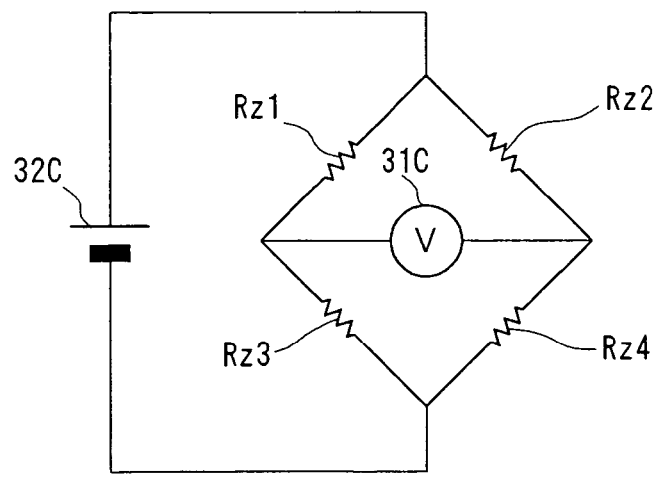
FIG. 13 is a diagram showing a bridge circuit detecting Z-axial acceleration using the semiconductor acceleration sensor in the first embodiment of the present invention.

Three resistance bridge circuits are constituted as shown in FIGS. 11 to 13 when using the semiconductor acceleration sensor 10 with the above-mentioned configuration. Thus, as a bridge circuit for detecting acceleration in an X-axis direction, as shown in FIG. 11, a positive electrode of a DC power supply 32A is connected to a node of an end of the piezo resistance element Rx1, and an end of the piezo resistance element Rx2, and a negative electrode of the DC power supply 32A is connected to a node of an end of the piezo resistance element Rx3, and an end of the piezo resistance element Rx4. Further, one end of a voltage detector 31A is connected to a node of another end of the piezo resistance element Rx1, and another end of the piezo resistance element Rx4, and another end of the voltage detector 31A is connected to a node of another end of the piezo resistance element Rx2, and another end of the piezo resistance element Rx3.

In addition, as a bridge circuit for detecting acceleration in a Y-axis direction, as shown in FIG. 12, a positive electrode of a DC power supply 32B is connected to a node of an end of the piezo resistance element Ry1, and an end of the piezo resistance element Ry2, and a negative electrode of the DC power supply 32B is connected to a node of an end of the piezo resistance element Ry3, and an end of the piezo resistance element Ry4. Further, one end of a voltage detector 31B is connected to a node of another end of the piezo resistance element Ry1, and another end of the piezo resistance element Ry4, and another end of the voltage detector 31B is connected to a node of another end of the piezo resistance element Ry2, and another end of the piezo resistance element Ry3.

Furthermore, as a bridge circuit for detecting acceleration in a Z-axis direction, as shown in FIG. 13, a positive electrode of a DC power supply 32C is connected to a node of an end of the piezo resistance element Rz1, and an end of the piezo resistance element Rz2, and a negative electrode of the DC power supply 32C is connected to a node of an end of the piezo resistance element Rz3, and an end of the piezo resistance element Rz4. Further, one end of a voltage detector 31C is connected to a node of another end of the piezo resistance element Rz1, and another end of the piezo resistance element Rz3, and another end of the voltage detector 31C is connected to a node of another end of the piezo resistance element Rz2, and another end of the piezoresistance element Rz4.

According to the semiconductor acceleration sensor 10 with the above-mentioned configuration, when a force generated in connection with the acceleration applied to the sensor 10 is applied to the plumb bob 15, strain arises in respective diaphragm blades 13a to 13d, and the resistance of the piezo resistance elements Rx1 to Rx4, Ry1 to Ry4, Rz1 to Rz4 varies with these. Therefore, the accelerations in the X-, Y-, and Z-axis directions which are mutually orthogonal are detectable by forming resistance bridge circuits with the piezo resistance elements Rx1 to Rx4, Ry1 to Ry4, Rz1 to Rz4 provided in respective diaphragm blades 13a to 13d.

Figure 14:
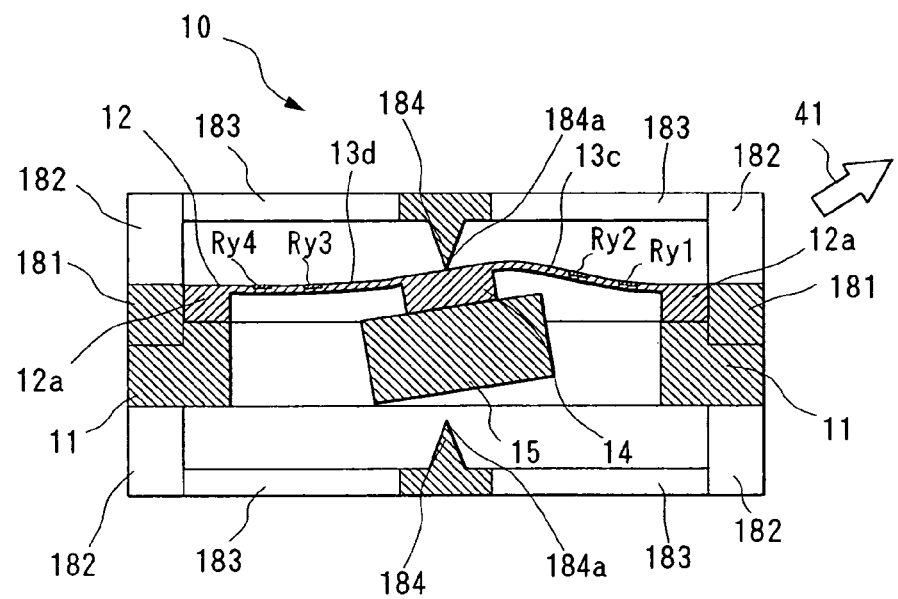
FIG. 14 is a drawing for explaining the operation of the semiconductor acceleration sensor in the first embodiment of the present invention.
Figure 15:
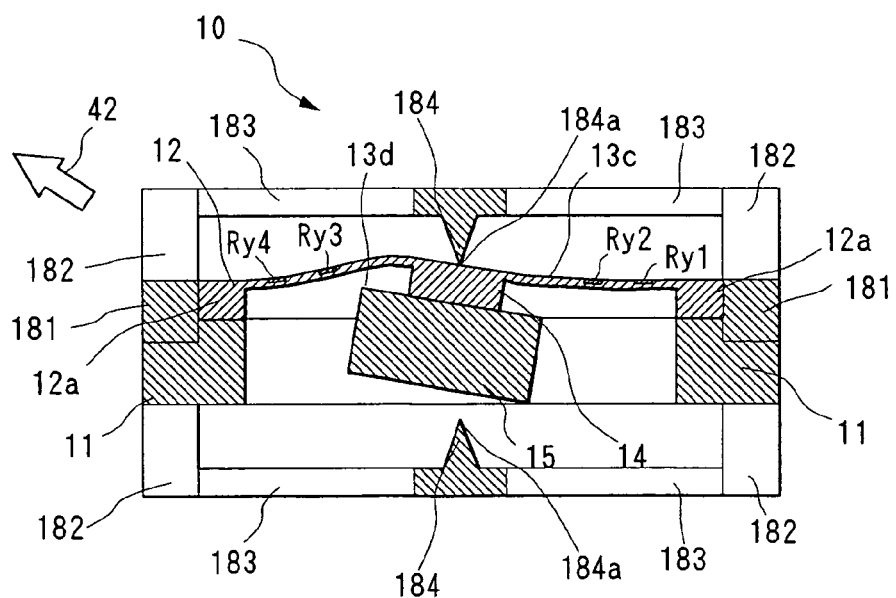
FIG. 15 is a drawing for explaining the operation of the semiconductor acceleration sensor in the first embodiment of the present invention.

Furthermore, although the diaphragm 13 is distorted and extended in the direction where forces 41 and 42 act when the forces equal to or more than a predetermined value are applied to the other face sides of the diaphragm 13 when such acceleration that the forces 41 and 42 including a force component in a direction perpendicular to a face of the diaphragm 13 act is applied as shown in FIGS. 14 and 15, its displacement is supported and is restricted by an apex 184a of the protruding section 184, and hence, respective diaphragm blades 13a to 13d are not extended to the maximum extent. Thereby, since a position of the plumb bob 15 displaces with the end 184a of the protruding section 184 becoming a fulcrum also when a force equal to or more than a predetermined value is applied to another face side of the diaphragm 13, it is possible to detect the acceleration in a direction parallel to a face of the diaphragm 13.

By the above-mentioned semiconductor acceleration sensor 10, it is possible to detect accelerations in the X-, Y-, and Z-axis directions, which are generated in four corners of a motor vehicle and are orthogonal mutually, when the motor vehicle is traveling, as shown in FIG. 2. In addition, it is also possible to estimate the grip of the tire 2 from the acceleration in the Z-axis direction.

On the other hand, an A/D conversion circuit 171 converts into a digital signal an analog electric signal, outputted from the acceleration sensor 10, and outputs it to the CPU 141. This digital signal corresponds to values of the accelerations in the above-mentioned X-, Y-, and Z-axis directions.

Furthermore, although acceleration in a positive direction and acceleration in a negative direction exist as accelerations generated in respective X-, Y-, and Z-axis directions, it is possible in this embodiment to detect both accelerations.

In addition, in this embodiment, it is made hard to be influenced by metal by using the 2.45-GHz-band frequency as the above-mentioned first and second frequencies as mentioned above. In this way, in order to make it hard to be influenced by metal, it is preferable to use a 1-GHz or more frequency as the above-mentioned first and second frequencies.

The monitoring device 200 is connected to the stability control unit 700 with a cable, and operates with the electrical energy sent from the stability control unit 700.

Figure 16:
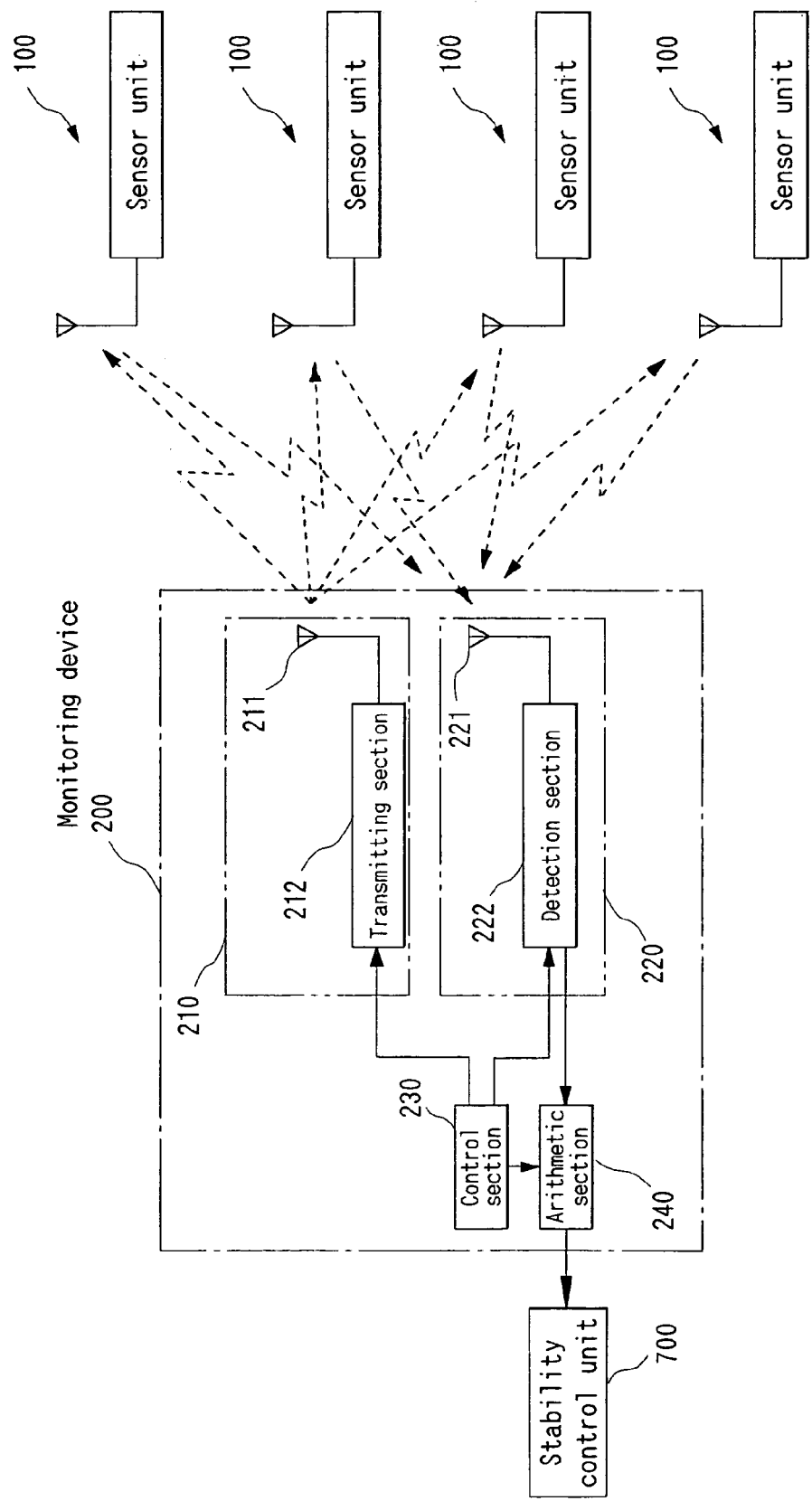
FIG. 16 is a structural diagram showing an electric system circuit of a monitoring device in the first embodiment of the present invention.

An electric system circuit of the monitoring device 200 is composed of a radiation unit 210, a wave-receiving unit 220, a control section 230, and an arithmetic section 240 as shown in FIG. 16. Here, the control section 230 and arithmetic section 240 are composed of a widely known CPU, and a memory circuit composed of ROM where a program which operates this CPU is stored, RAM necessary for performing data processing, and the like.

The radiation unit 210 is composed of an antenna 211 and a transmitting section 212 for radiating an electromagnetic wave at a 2.45-GHz-band predetermined frequency (the above-mentioned first frequency), and radiates the electromagnetic wave at the above-mentioned first frequency from the antenna 211 on the basis of an instruction from the control section 230.

As an example of the transmitting section 212, similarly to the transmitting section 160 of the sensor unit 100, it is possible to cite the circuit which is composed of an oscillation circuit 161, a modulation circuit 162, and a high frequency amplifying circuit 163. Thereby, the 2.45-GHz electromagnetic wave is radiated from the antenna 211. Furthermore, high-frequency power outputted from the transmitting section 212 is set at a value of such extent that electrical energy can be supplied from the antenna 211 for electromagnetic wave radiation of the monitoring device 200 to the sensor unit 100.

The wave-receiving unit 220 is composed of an antenna 221 and a detection section 222 for wave-receiving an electromagnetic wave at a 2.45-GHz-band predetermined frequency (the above-mentioned second frequency), detects the electromagnetic wave at the above-mentioned second frequency which is wave-received by the antenna 221 on the basis of an instruction from the control section 230, and converts a signal, which is detected and obtained, into a digital signal to output it to the arithmetic section 250. As an example of the detection section 222, the same circuit as the detection section 150 of the sensor unit 100 is cited.

When starting operation by electrical energy being supplied from the stability control unit 700, the control section 230 drives the transmitting section 212 to make an electromagnetic wave radiated only during predetermined time t3, and then, drives the detection section 222 during predetermined time t4 to make the detection section 222 output a digital signal to the arithmetic section 240. The arithmetic section 240 calculates the above-mentioned acceleration on the basis of this digital signal, and outputs it to the stability control unit 700. Then, the control section 230 repeats the same processing as the above-mentioned.

Furthermore, in this embodiment, the above-mentioned radiation time t3 in the monitoring device 200 is set at 0.15 ms, and the above-mentioned wave-receiving time t4 is at 0.30 ms, respectively. In this embodiment, by radiating an electromagnetic wave from the radiation unit 210 only for the time t3, it is possible to store electricity not less than 3 V as sufficient electrical energy to drive the sensor unit 100.

Distortion characteristic information expressing the relationship between the accelerations in the above-mentioned X-, Y-, and Z-axis directions and the distortion amount of the tire 2 which is obtained from the monitoring device 200 is acquired beforehand by the measurement such as an experiment and is stored in the stability control unit 700. Furthermore, the stability control unit 700 estimates the distortion amount of each tire 2 on the basis of the detection result on acceleration and the distortion characteristic information, controls the pressure control valve 630 as well as driving the subthrottle actuator 412 on the basis of this estimated distortion amount of the tire 2, and drives the brake drive actuator 640.

Therefore, according to the motor vehicle drive control system mentioned above, it is possible to detect the accelerations in the X-, Y-, and Z-axis directions, which are generated in four corners of a motor vehicle respectively and which are orthogonal mutually, when the motor vehicle is traveling, furthermore, it is possible to estimate the distortion amount of the tire 2, a sideslip state of a motor vehicle body, an idling state of the tire 2, and the like which are generated at the time of the motor vehicle traveling since it is possible to estimate the grip and lift of the tire 2 from the acceleration in the Z-axis direction, and it is possible to control the above-mentioned respective actuators so that stable traveling can be performed on the basis of these.

In addition, since the sensor unit 100 is mounted on a motor vehicle body instead of the tire 2, it is possible to perform highly accurate control even if the tire 2 is replaced to a tire, whose type differs, and a frictional force between the tire 2 and a road surface changes. Furthermore, even if it is a motor vehicle which makes drive control according to each of the tires 2 such as a 4WD vehicle, it is possible to perform highly accurate control.

As mentioned above, since it is made in this embodiment that the sensor unit 100 transmits detection result when wave-receiving an electromagnetic wave radiated from the monitoring device 200 and obtains electrical energy, it is possible to obtain the above-mentioned effects even if the detection section 150 is not provided. In addition, in the configuration that the sensor unit 100 is provided with the detection section 150, by setting a program and the like so that the sensor unit 100 may transmit detection result when receiving self identification information from the monitoring device 200, it never arises to transmit the detection result by unnecessary noise from the outside, and thereby, it is possible to prevent an unnecessary electromagnetic wave from being radiated.

In addition, although both of the above-mentioned first and second frequencies are set at 2.45 GHZ in this embodiment, it is not limited to this, but it is possible to obtain detection data by the sensor unit 100 in high precision by extremely decreasing the influence of reflection, cutoff, and the like of an electromagnetic wave by tires and metal of a motor vehicle body so long as it is 1 GHz or more of frequency as mentioned above, and hence, there arises no problem even if these first and second frequencies are different frequencies. It is preferable to suitably set these first and second frequencies at the time of a design.

Furthermore, although it is preferable for the object of the present invention to detect accelerations in the X-, Y-, and Z-axis directions which are generated in each of four corners of the motor vehicle 1 and which are orthogonal mutually, it is possible to control each actuator even if a part or all of respective sensor units 100 are provided in locations other than four corners of a motor vehicle, needless to say, even if the number of the sensor units is not less than four, or even if it is less than four.

Next, a second embodiment of the present invention will be explained.

Figure 17:
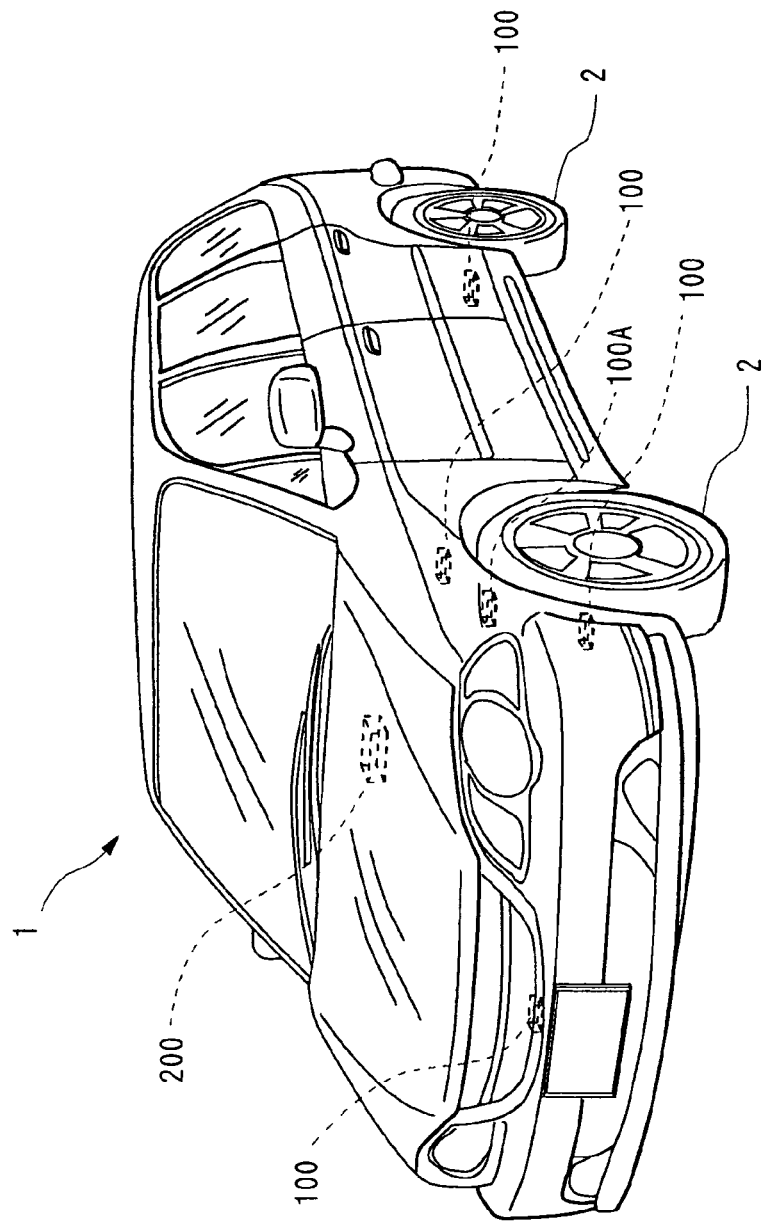
FIG. 17 is an outside view showing the arrangement of sensor units in a motor vehicle in a second embodiment of the present invention.
Figure 18:
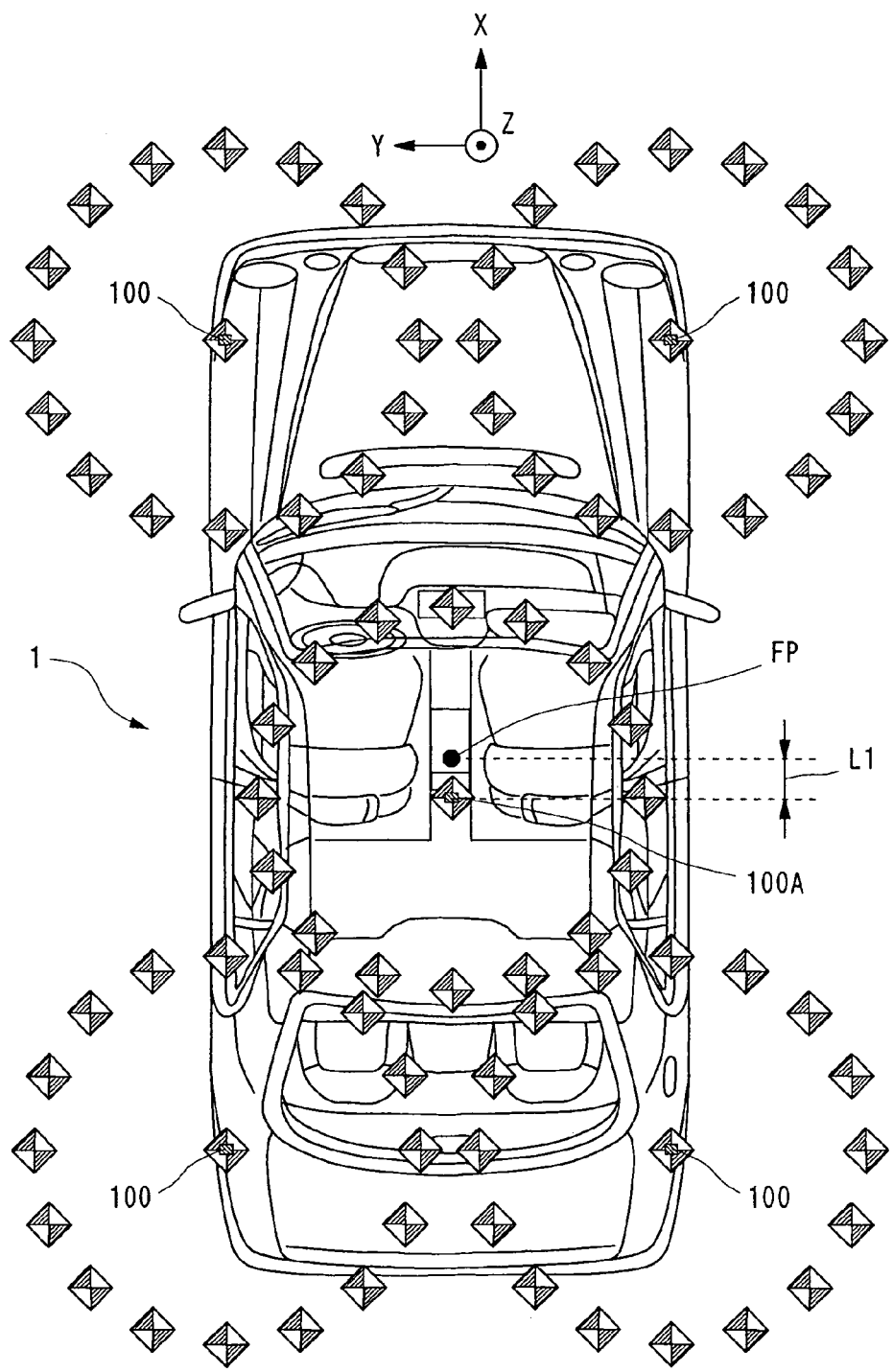
FIG. 18 is a top view showing the arrangement of sensor units in a motor vehicle in the second embodiment of the present invention.
Figure 19:
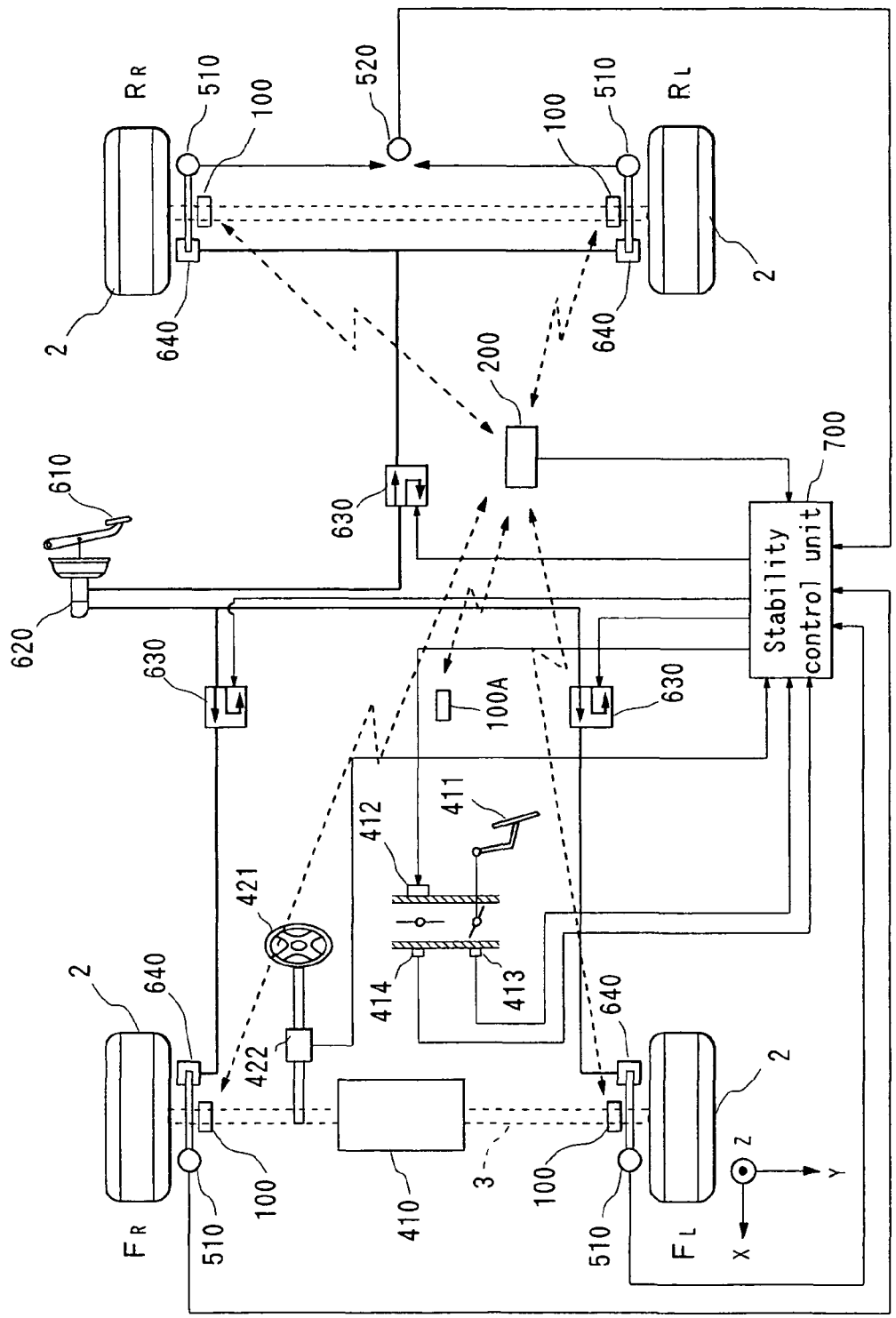
FIG. 19 is a structural diagram showing a motor vehicle drive control system in the second embodiment of the present invention.
Figure 20:
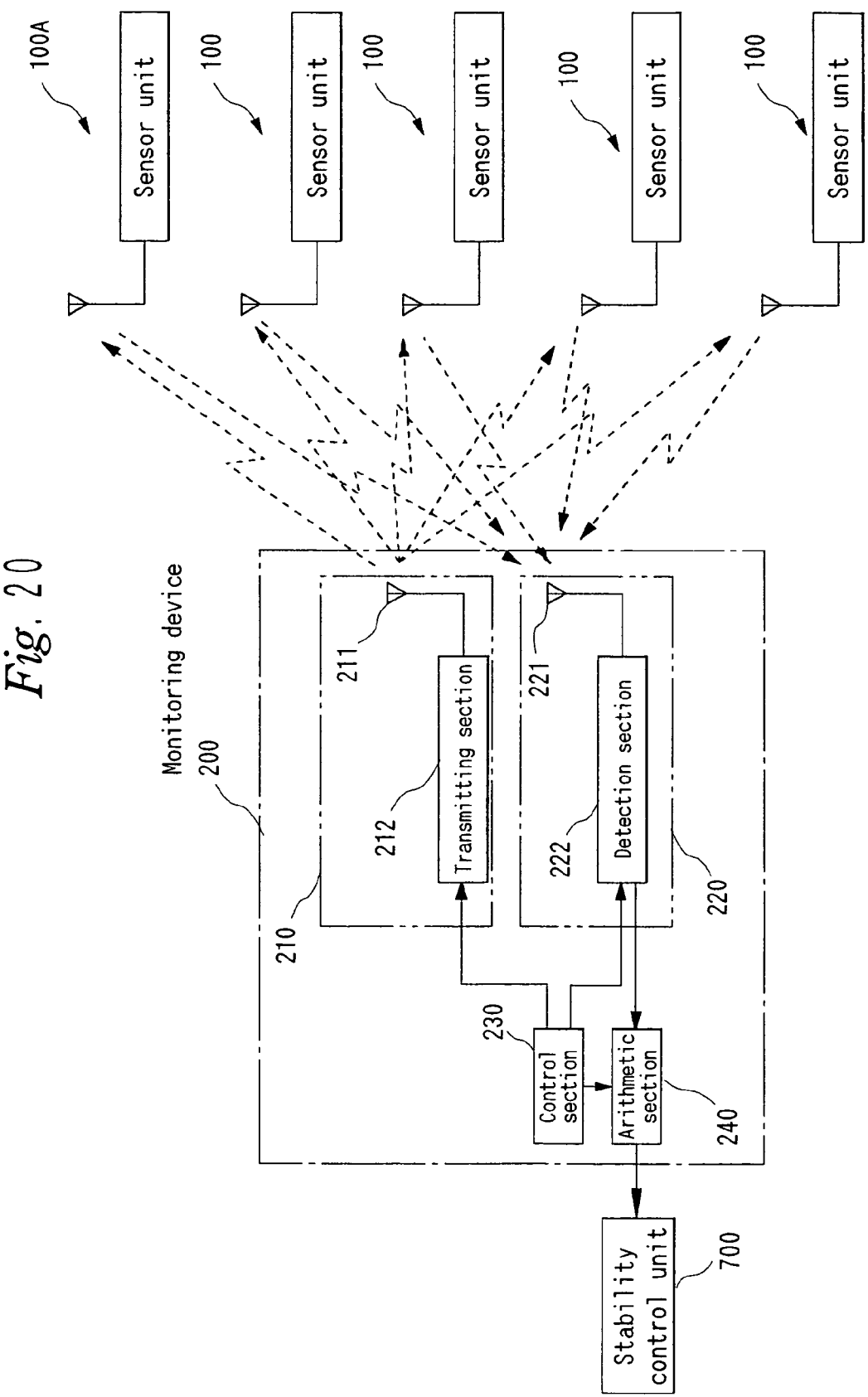
FIG. 20 is a drawing for explaining communication among a monitoring device and sensor units in the second embodiment of the present invention.

FIG. 17 is an outside view showing the arrangement of sensor units in a motor vehicle in a second embodiment of the present invention, FIG. 18 is a top view showing the arrangement of sensor units in a motor vehicle in the second embodiment of the present invention, FIG. 19 is a structural diagram showing a motor vehicle drive control system in the second embodiment of the present invention, and FIG. 20 is a drawing for explaining communication among a monitoring device and sensor units in the second embodiment of the present invention.

In the drawings, the same components as those of the first embodiment mentioned above are expressed with the same reference numerals, and their explanation will be omitted. In addition, difference between the second embodiment and first embodiment is that, in the second embodiment, the sensor unit 100A is provided also in a center section of the motor vehicle 1, and the stability control unit 700 controls each actuator also in consideration of the acceleration detected by the sensor unit 100A.

The sensor unit 100A has the same configuration as the sensor unit 100 of the first embodiment, and as shown in FIG. 18, it is located behind the central point FP of the motor vehicle 1 by the distance L1. Thus, it is possible to detect the change of the center position of the motor vehicle 1 in high accuracy by providing the sensor unit 100A in a position shifted from the central point FP. Furthermore, it is preferable to set the distance L1 suitably according to a type of a motor vehicle.

According to the above-mentioned configuration, since each actuator is given drive control by the stability control unit 700 in consideration of the acceleration detected by the sensor unit 100A located in the center section of a motor vehicle by one monitoring device 200, it is possible to perform further highly accurate control, and hence, it is possible to further increase stability at the time of motor vehicle traveling.

Next, a third embodiment of the present invention will be explained.

Figure 21:
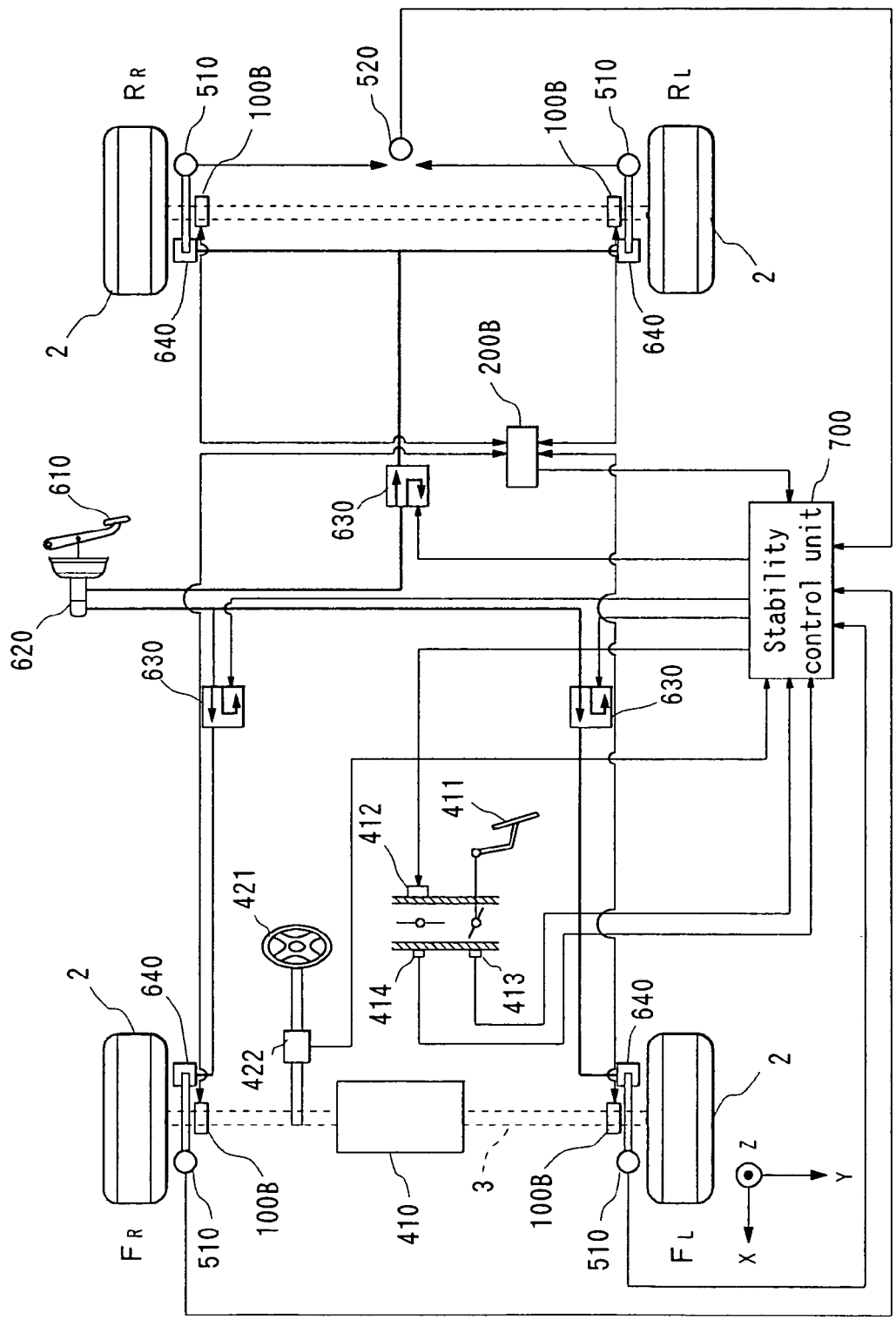
FIG. 21 is a structural diagram showing a motor vehicle drive control system in a third embodiment of the present invention.
Figure 22:
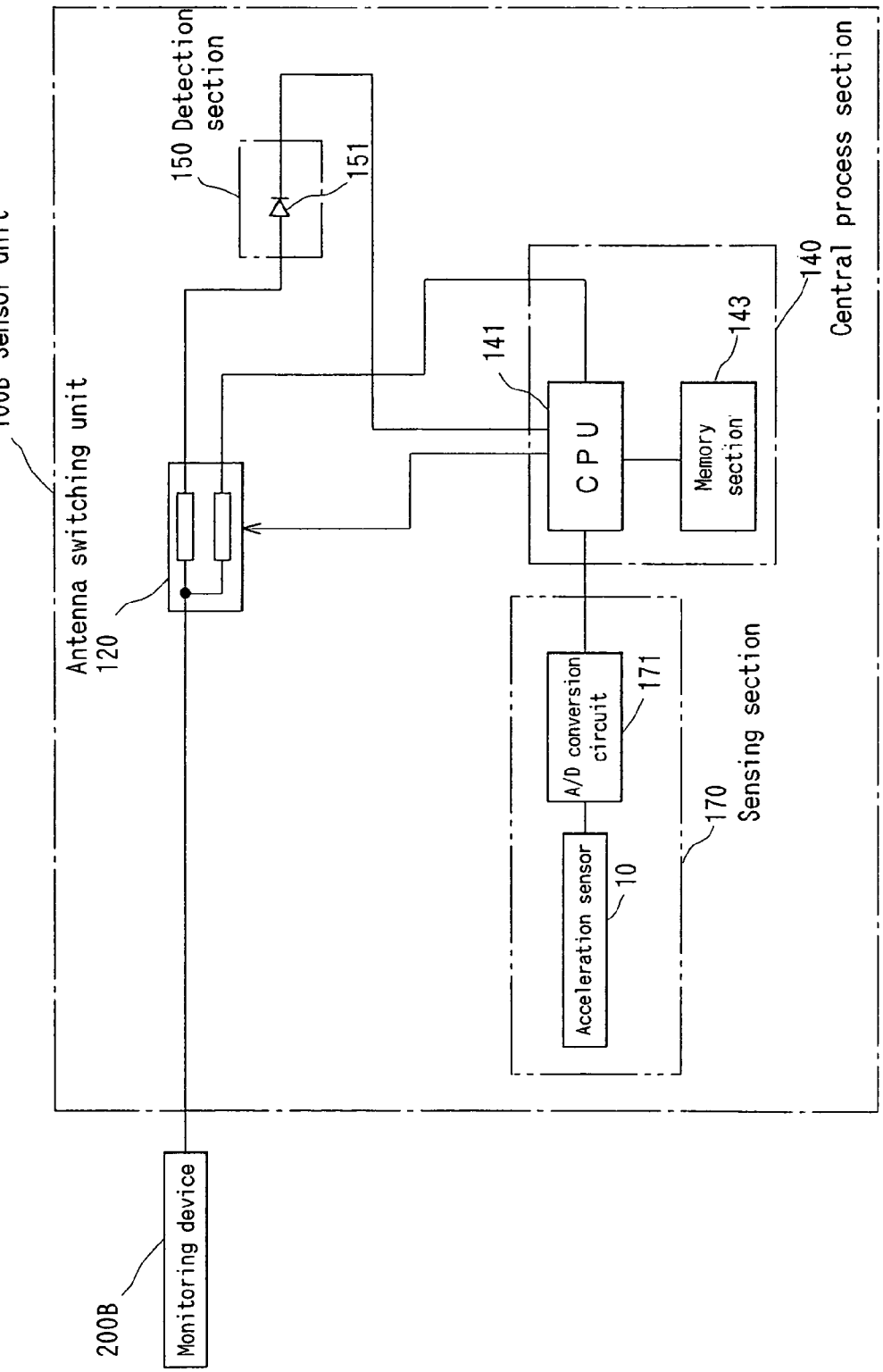
FIG. 22 is a structural diagram showing an electric system circuit of a sensor unit in the third embodiment of the present invention.
Figure 23:
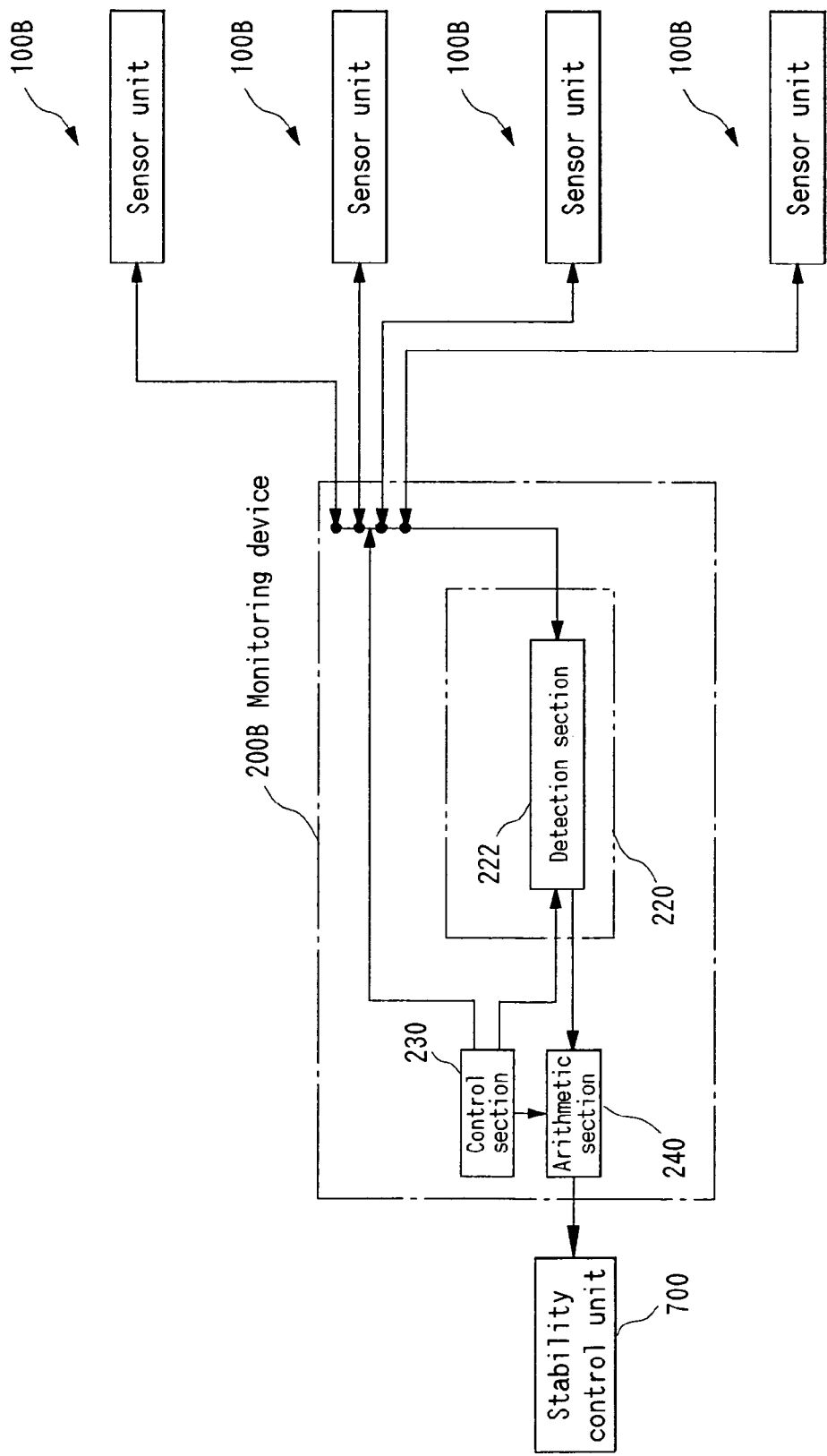
FIG. 23 is a drawing for explaining communication among a monitoring device and sensor units in the third embodiment of the present invention.

FIG. 21 is a structural diagram showing a motor vehicle drive control system in a third embodiment of the present invention, FIG. 22 is a structural diagram showing an electric system circuit of a sensor unit in the third embodiment of the present invention, and FIG. 23 is a drawing for explaining communication among a monitoring device and sensor units in the third embodiment of the present invention.

In the drawings, the same components as those of the first embodiment mentioned above are expressed with the same reference numerals, and their explanation will be omitted. In addition, difference between the third embodiment and first embodiment is that, in the third embodiment, the monitoring device 200B and each sensor unit 100B are connected with a cable, and the supply of electrical energy and the transmission of digital information including detection result is performed using the cable.

Since the sensor unit 100B operates not from a high frequency current induced at an antenna, but by electrical energy sent through the cable from the monitoring device 200B, the antenna and a rectifier circuit become unnecessary. In addition, since digital information is transmitted not through an electromagnetic wave, which is radiated from an antenna, but through the cable, not only a transmitting section becomes unnecessary, but also a D/A conversion circuit becomes unnecessary since the digital information which the CPU 141 generates is transmitted as it is.

Furthermore, since not requiring a radiation section which supplies electrical energy by an electromagnetic wave, the monitoring device 200B is connected to each sensor unit 100B through a cable. Furthermore, although electrical energy is sent to each sensor unit 100B from the monitoring device 200B in this embodiment, this is not limited to the monitoring device 200B, but it is also sufficient to be another apparatus which is connected through a cable.

Thus, it is possible to obtain the same effects as the first embodiment in simpler configuration and operation by performing the supply of electrical energy, and the transmission of digital information using a cable.

Next, a fourth embodiment of the present invention will be explained.

Figure 24:
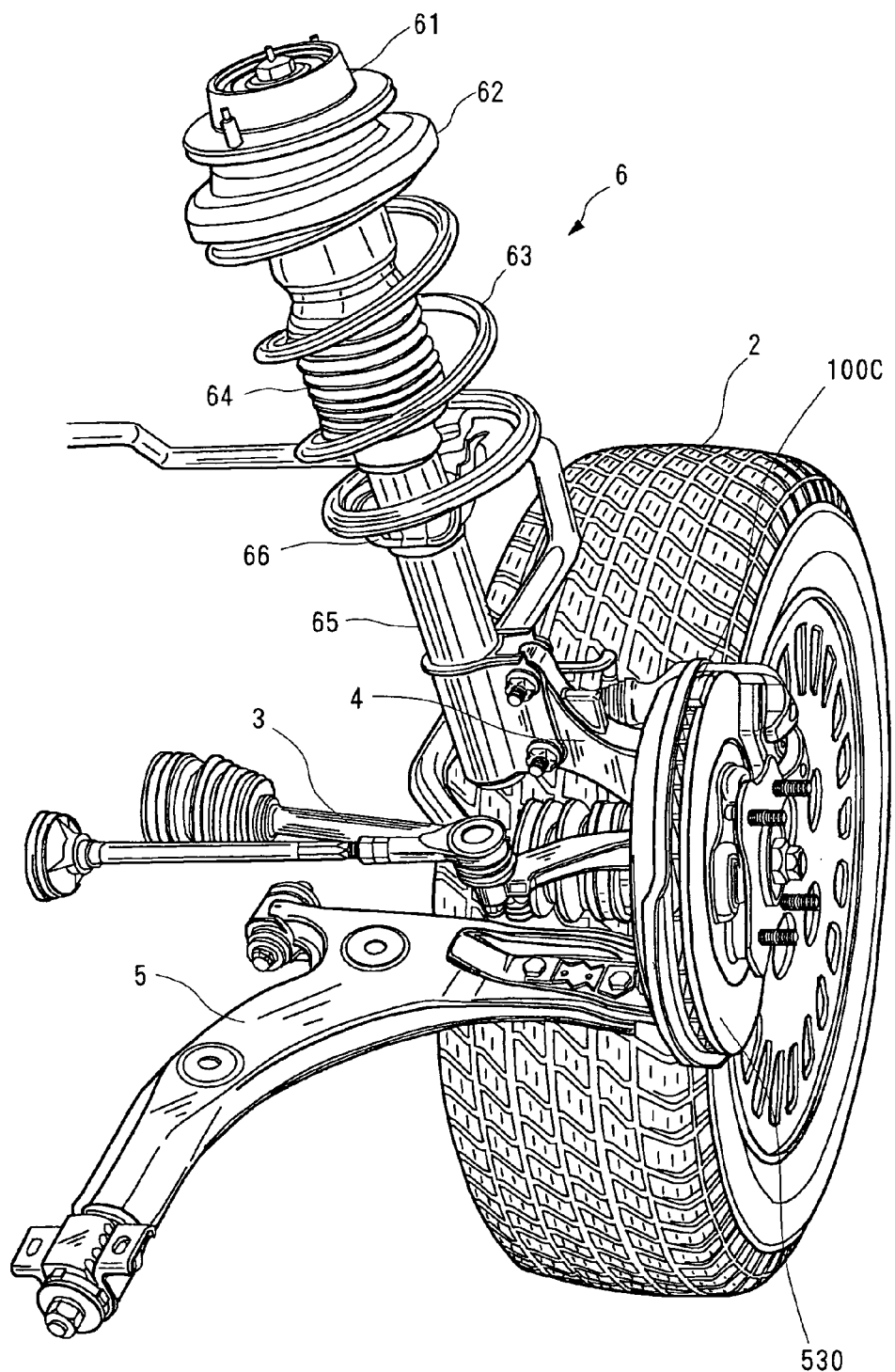
FIG. 24 is a drawing for explaining a mounted state of a sensor unit in a fourth embodiment of the present invention.
Figure 25:
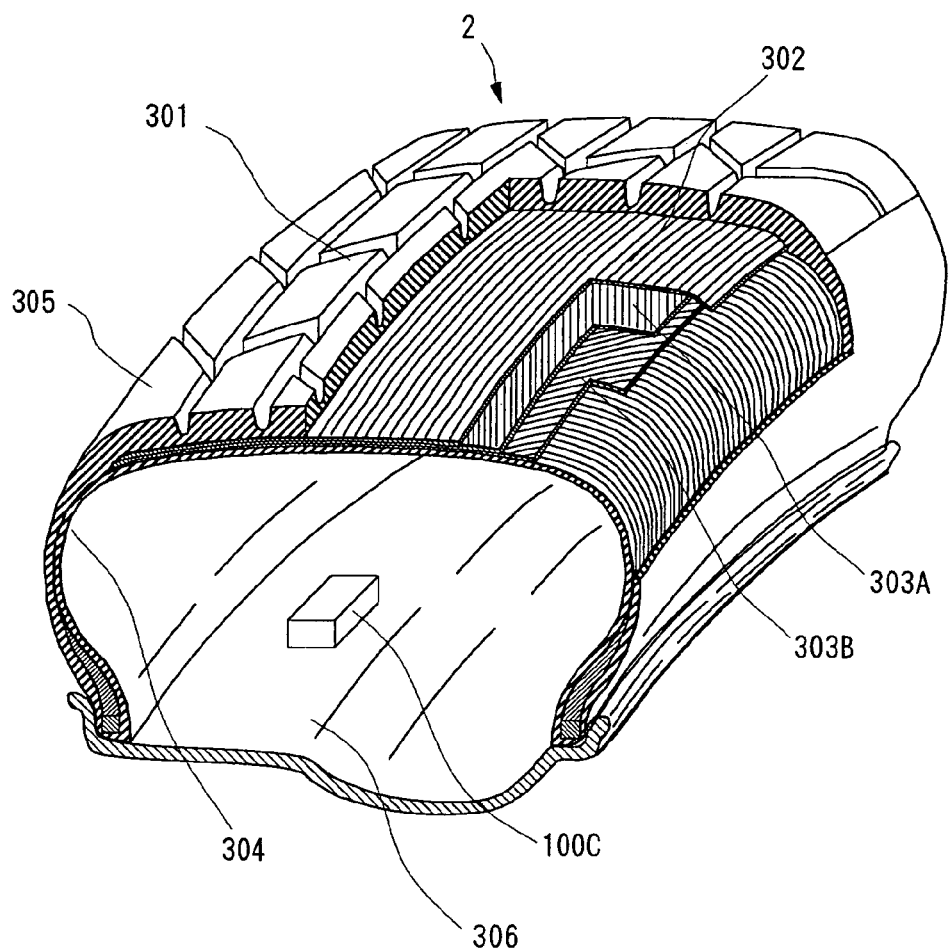
FIG. 25 is a drawing for explaining another mounted state of a sensor unit in the fourth embodiment of the present invention.
Figure 26:
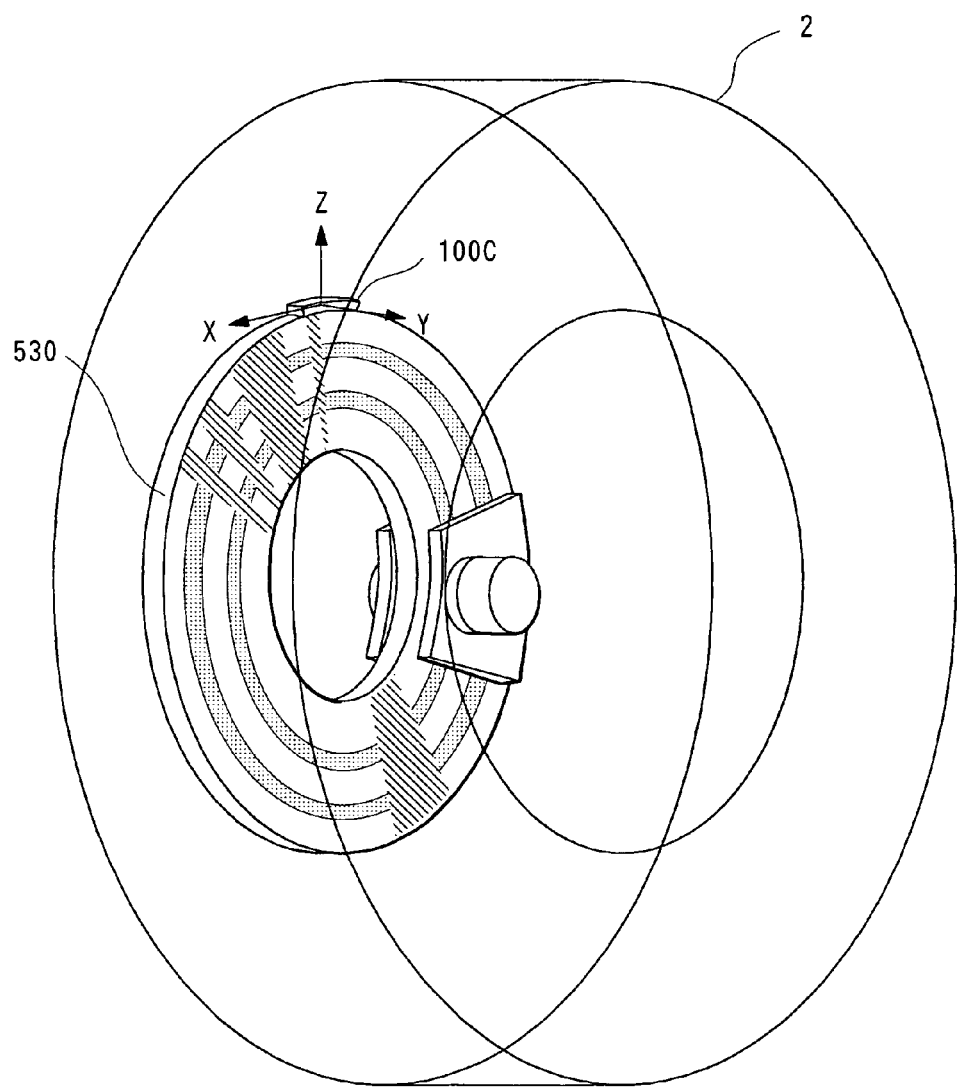
FIG. 26 is a drawing for explaining X-, Y-, and Z-axial acceleration, which is detected by a sensor unit, in the fourth embodiment of the present invention.
Figure 27:
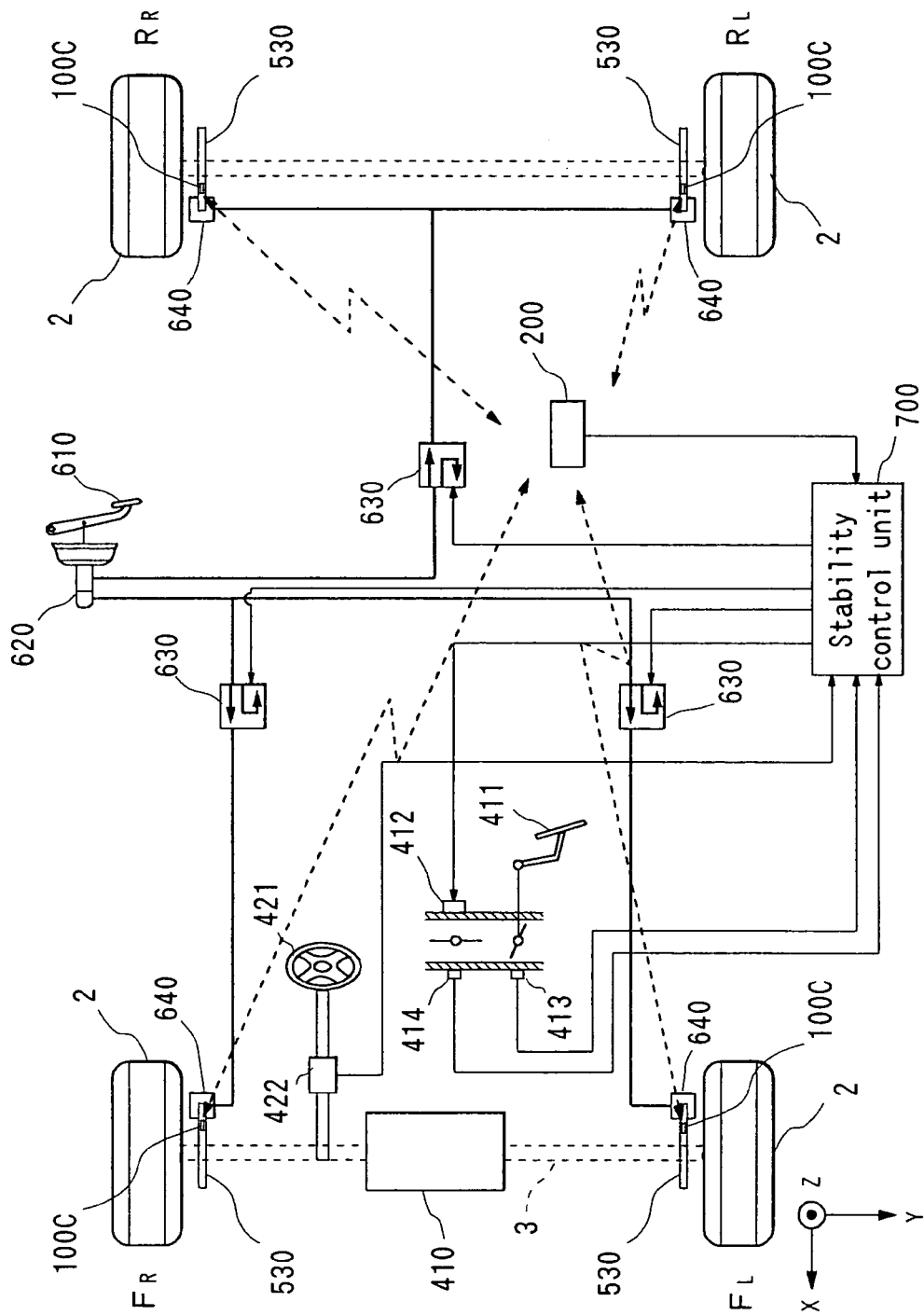
FIG. 27 is a structural diagram showing a motor vehicle drive control system in the fourth embodiment of the present invention.

FIG. 24 is a drawing for explaining a mounted state of a sensor unit in a fourth embodiment of the present invention, FIG. 25 is a drawing for explaining another mounted state of a sensor unit in the fourth embodiment of the present invention, FIG. 26 is a drawing for explaining X-, Y-, and Z-axial accelerations, which are detected by sensor units, in the fourth embodiment of the present invention, and FIG. 27 is a structural diagram showing a motor vehicle drive control system in the fourth embodiment of the present invention.

In the drawings, the same components as those of the first embodiment mentioned above are expressed with the same reference numerals, and their explanation will be omitted. In addition, difference between the fourth embodiment and first embodiment is that, in the fourth embodiment, in order to mount a wheel, each sensor unit 100C is provided in a body of rotation which is provided in a motor vehicle body side, and the stability control unit 700 controls each actuator by acceleration detected by the sensor unit 100C.

The sensor unit 100C has the same configuration as the sensor unit 100 of the first embodiment, and is fixed to a predetermined position of the brake disc 530 which rotates with the tire 2.

Furthermore, although the sensor unit 100C is fixed to the brake disc 530 in this embodiment, this is not limited to this, but it is also sufficient to fix it to the axle 3, a rotor (not shown), or the like so long as it is a body of rotation. For example, as shown in FIG. 25, it may be also fixed to a rim 306. In the drawing, the tire 2 is, for example, a widely known tubeless radial tire, which is composed of a tire body 305, the rim 306, and a wheel (not shown), and the tire body 305 is composed of a widely known cap tread 301, an undertread 302, belts 303A and 303B, a carcass 304, and the like.

Here, the sensor unit 100C is provided as shown in FIG. 26 so that the X-axis may correspond to a rotary direction of the tire 2, the Y-axis may correspond to a direction of a rotating shaft, and the Z-axis may correspond to a direction orthogonal to the rotating shaft, it is possible to detect the accelerations in the X-, Y-, and Z-axis directions, which are generated in connection with the rotation of the tire 2 and which are orthogonal mutually, when the tire 2 is rotating and a motor vehicle is traveling.

In addition, since it is possible to find the rotating speed of a wheel from the acceleration in an X-axis direction as described later, a rotating speed sensor becomes unnecessary by calculating the rotating speed of a wheel per unit time in the sensor unit 100C, and transmitting it with including it in digital information.

Figure 30:
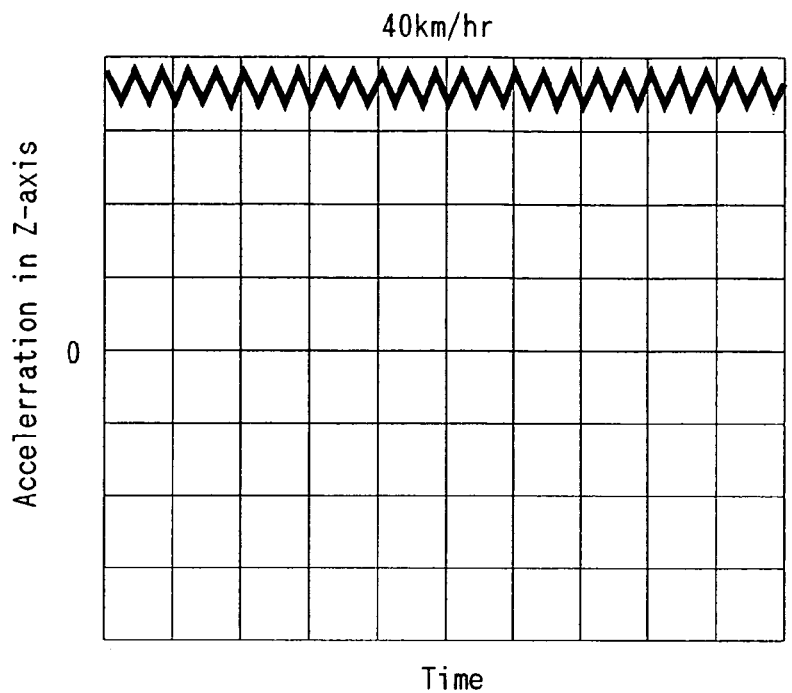
FIG. 30 is a graph showing the observation result of Z-axial acceleration in the fourth embodiment of the present invention.

Next, the operation of a system which consists of the above-mentioned configuration will be explained with reference to FIGS. 28 to 37. FIGS. 28 to 30 show measured result of acceleration in a Z-axis direction, FIGS. 31 to 33 show measured result of acceleration in an X-axis direction, FIGS. 34 to 35 show measured result of acceleration in a Y-axis direction, FIG. 36 shows measured result of acceleration in an X-axis direction when applying brakes, and FIG. 37 shows actually measured result of acceleration in a Z-axis direction when applying the brakes, respectively.

In FIGS. 28 to 30, FIG. 28 shows actual measurements of acceleration in the Z-axis direction at the time of traveling at 2.5 km/h, FIG. 29 shows actual measurements of acceleration in the Z-axis direction at the time of traveling at 20 km/h, and FIG. 30 shows actual measurements of acceleration in the Z-axis direction at the time of traveling at 40 km/h. In this way, since the centrifugal force of a wheel increases as travel speed increases, the acceleration in the Z-axis direction also increases. Therefore, it is possible to obtain travel speed from the acceleration in the Z-axis direction. Furthermore, in the drawings, the actual measurements become a sine wave form because it is influenced by gravitational acceleration.

Figure 31:
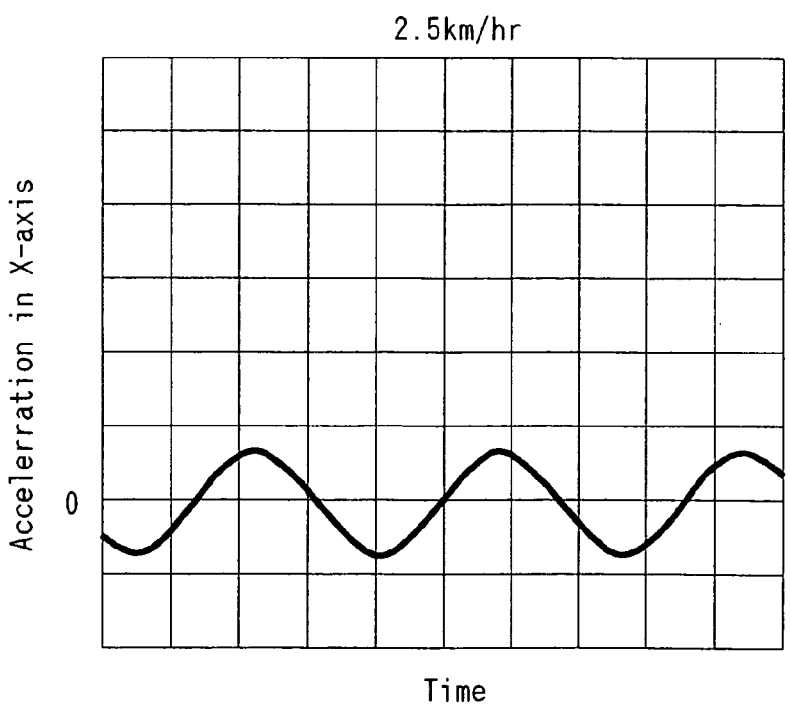
FIG. 31 is a graph showing the observation result of X-axial acceleration in the fourth embodiment of the present invention.
Figure 32:
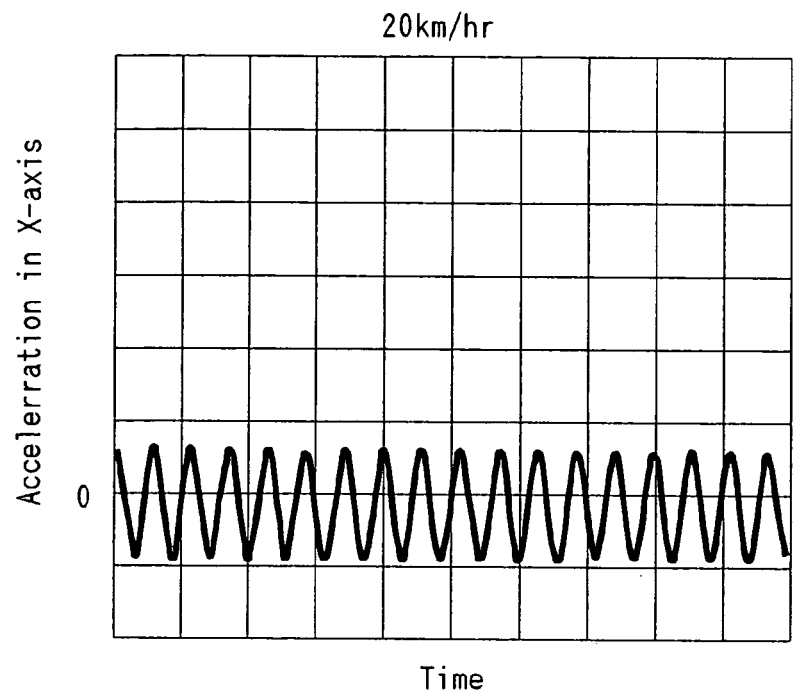
FIG. 32 is a graph showing the observation result of X-axial acceleration in the fourth embodiment of the present invention.
Figure 33:
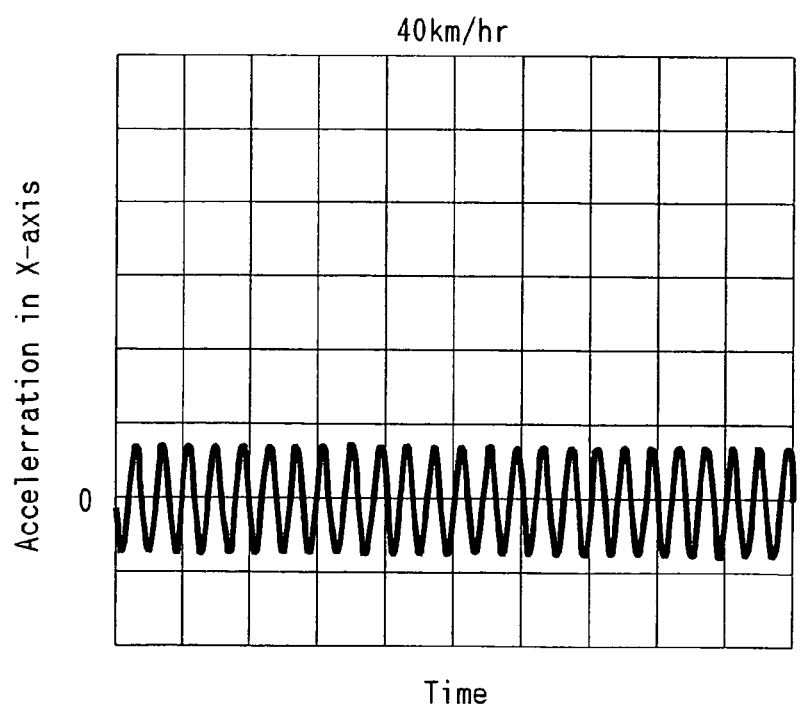
FIG. 33 is a graph showing the observation result of X-axial acceleration in the fourth embodiment of the present invention.
Figure 38:
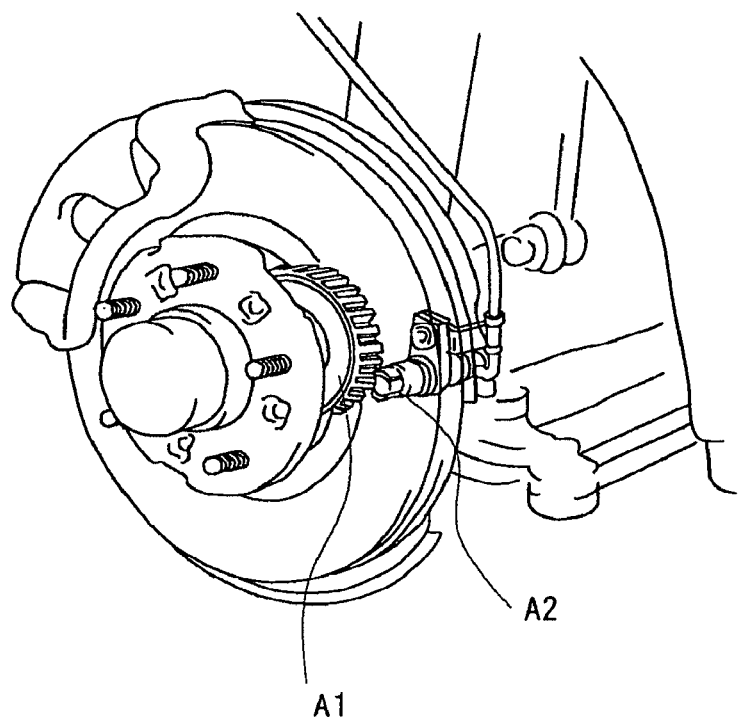
FIG. 38 is an explanatory diagram of a rotating speed detection mechanism of a wheel in a conventional example.
Figure 39:
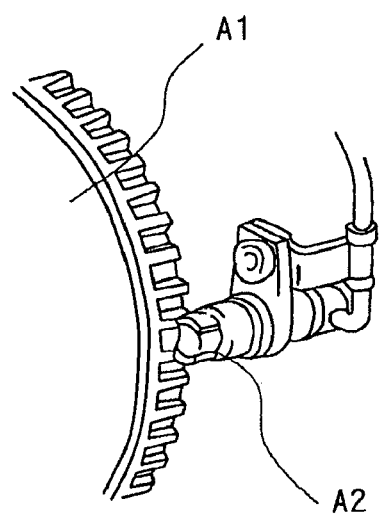
FIG. 39 is an explanatory diagram of a rotating speed detection mechanism of a wheel in a conventional example.

In FIGS. 31 to 33, FIG. 31 shows actual measurements of acceleration in the X-axis direction at the time of traveling at 2.5 km/h, FIG. 32 shows actual measurements of acceleration in the X-axis direction at the time of traveling at 20 km/h, and FIG. 33 shows actual measurements of acceleration in the X-axis direction at the time of traveling at 40 km/h. In this way, since the rotating speed of a wheel increases as travel speed increases, a period of change of the acceleration in the X-axis direction becomes short. Therefore, it is possible to obtain the rotation speed of the wheel from the acceleration in the X-axis direction. Furthermore, in the drawings, the actual measurements become a sine wave form because it is influenced by gravitational acceleration similarly to the above.

FIG. 34 shows actual measurements of acceleration in the Y-axis direction when turning a wheel to the right at the time of traveling, and FIG. 35 shows actual measurements of acceleration in the Y-axis direction when turning a wheel to the left at the time of traveling. In this way, when a steering wheel is turned and wheels are swung to the right and left, the acceleration in the Y-axis direction appears remarkably. In addition, it is needless to say that, when a motor vehicle body sideslips, the acceleration in the Y-axis direction arises similarly. Furthermore, in each actual measurement of the acceleration in the above-mentioned Y-axis direction, the acceleration in a reverse direction arises because a driver turns a little a steering wheel in a reverse direction unconsciously.

In addition, as shown in FIGS. 36 and 37, it could be also detected accurately that time from applying brakes (at the time of braking: when a brake pedal is stepped in) to the rotation of a wheel stopping was about 0.2 second.

Therefore, according to the above-mentioned configuration, it is possible to estimate the distortion amount of the tire 2, a sideslip state of a motor vehicle body, an idle state of the tire, and the like, which are generated by acceleration, by detecting this acceleration generated by the rotation of a wheel and the like, and hence, similarly to the first embodiment, it is possible to control each actuator mentioned above, so that stable traveling can be performed on the basis of these.

Furthermore, since the sensor unit 100C is mounted on a body of rotation provided in a motor vehicle body for mounting a wheel not on a wheel, it is possible to perform highly accurate control even if the type of the tire 2 which is mounted in a wheel is different, and a frictional force between the tire 2 and a road surface changes. Furthermore, even if it is a motor vehicle which makes separately drive control according to each of the tires 2 such as a 4WD vehicle, it is possible to perform highly accurate control.

Furthermore, it is also acceptable to constitute a system by combining the configuration of above-mentioned respective embodiments or replacing a part of components.

In addition, although a motor vehicle drive control system of a four-wheel motor vehicle is explained in the above-mentioned each embodiment as an example, it is needless to say that the same effect can be obtained even if it is a motor vehicle other than a four-wheel vehicle, for example, a two-wheel vehicle or a motor vehicle with six or more wheels.

Moreover, it is also acceptable to perform the drive control of an actuator of an electric power steering, or an actuator of an electric suspension as an actuator which the stability control unit 700 gives drive control.

In addition, it is also acceptable to detect the travel speed of a motor vehicle by a sensor, to fetch this detection result into the stability control unit 700, and to control each actuator also in consideration of travel speed.

Furthermore, the present invention is not limited to only the above-mentioned embodiments, but it is also acceptable to perform various kinds of modification within the scope of the present invention.

INDUSTRIAL APPLICABILITY OF THE INVENTION

Because of detecting accelerations in three directions, which are mutually orthogonal, in high degree of accuracy by a sensor unit provided in each of the front and rear, and left and right of a motor vehicle body, and performing the correction control of drive of a predetermined actuator on the basis of the acceleration detected, it becomes possible to perform suitable control at the time of motor vehicle traveling, and to be used for the braking control of a motor vehicle.

It is applicable to the applications of detecting the accelerations of the front and rear, and left and right of a motor vehicle body without requiring cable wiring, and the like since it is possible to detect the acceleration generated in each of the above-mentioned front and rear, and left and right only by being provided in a predetermined position in the front and rear, and left and right of the motor vehicle body.

The invention claimed is:

1. A motor vehicle drive control system providing control means which drives each drive actuator of an engine throttle, a steering, and brakes according to detection result of operation states of a motor vehicle to perform stability control at the time of motor vehicle traveling, comprising:

a plurality of sensor units which are provided in the front and rear, and left and right of a motor vehicle body respectively, wherein the sensors are arranged to detect a first acceleration generated in a fore-and-aft direction of the motor vehicle body, a second acceleration generated in a left-and-right direction of the vehicle body, and a third acceleration generated in an up-and-down direction of the motor vehicle body, to convert the detection result into digital values, and transmit digital information including the digital values; and a monitoring device which receives the digital information transmitted from the sensor units, and acquires the detection result of the first to third accelerations of every sensor unit, wherein the control means has means of performing correction control of drive of a predetermined drive actuator among the respective drive actuators on the basis of the detection result of the first to third accelerations acquired by the monitoring device, wherein a sensor unit is provided in each of a plurality of bodies of rotation, which are the wheels or which are bodies of rotation provided in a motor vehicle body side for mounting the wheels, and rotates with the respective wheel, and wherein each sensor provided in a body of rotation is arranged to detect accelerations in three mutually orthogonal directions, being (i) a rotary direction of the tire of the respective wheel, (ii) a direction of the axis of rotation of the respective wheel and (iii) a direction orthogonal to the axis of rotation of the respective wheel.

2. The motor vehicle drive control system according to claim 1, wherein the sensor unit is provided in a brake disc which rotates with an axle.

3. The motor vehicle drive control system according to claim 1, further comprising a central sensor unit which is provided in a center section of the motor vehicle body, detects first acceleration applied in a fore-and-aft direction of the vehicle body, second acceleration applied in a right-and-left direction of the vehicle body, and third acceleration applied in a up-and-down direction of the vehicle body, converts the detection result into digital values, and transmits digital information including the digital values;

wherein the monitoring device has means of receiving digital information transmitted from the central sensor unit, and acquiring the detection result of the first to third accelerations by the central sensor unit; and the control means has means of performing correction control of drive of the predetermined drive actuator on the basis of detection result of the first to third accelerations acquired by the monitoring device.

4. The motor vehicle drive control system according to claim 1, wherein the sensor unit has:

means of wave-receiving an electromagnetic wave at a first frequency;

means of transforming into electrical drive energy the wave-received electromagnetic wave energy at the first frequency; and means of operating by the electrical energy and transmitting the digital information using an electromagnetic wave at a second frequency; and the monitoring device has:

means of radiating an electromagnetic wave at the first frequency;

means of wave-receiving the electromagnetic wave at the second frequency; and means of extracting the digital information from the wave-received electromagnetic wave at the second frequency.

5. The motor vehicle drive control system according to claim 4, wherein the first frequency and the second frequency are the same frequencies.

6. The motor vehicle drive control system according to claim 1, wherein the sensor unit has memory means where identification information unique to itself is contained, and means of transmitting the identification information included in the digital information; and the monitoring device has means of identify the sensor unit by the identification information.

7. The motor vehicle drive control system according to claim 1, wherein the sensor unit comprises a semiconductor acceleration sensor having a silicon piezo type diaphragm detecting accelerations in directions which are orthogonal mutually.

8. The motor vehicle drive control system according to claim 1, wherein the sensor unit is provided in each of four corners of the front and rear, and left and right of a motor vehicle body.

* * * * *